US009517386B2

(12) United States Patent
Inoue et al.

(10) Patent No.: US 9,517,386 B2
(45) Date of Patent: *Dec. 13, 2016

(54) GOLF BALL RESIN COMPOSITION AND GOLF BALL USING THE SAME

(71) Applicant: Dunlop Sports Co., Ltd., Kobe-shi, Hyogo (JP)

(72) Inventors: Hidetaka Inoue, Hyogo (JP); Toshiyuki Tarao, Kobe (JP); Kuniyasu Horiuchi, Kobe (JP); Kazumi Kodama, Nagoya (JP); Keiichi Hattori, Nagoya (JP); Kotaro Ryuo, Osaka (JP)

(73) Assignee: DUNLOP SPORTS CO., LTD., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,637

(22) Filed: Oct. 28, 2014

(65) Prior Publication Data

US 2015/0119167 A1    Apr. 30, 2015

(30) Foreign Application Priority Data

Oct. 29, 2013  (JP) ................. 2013-224600

(51) Int. Cl.

| C08L 77/00 | (2006.01) |
| C08L 23/08 | (2006.01) |
| C08K 3/34 | (2006.01) |
| A63B 37/00 | (2006.01) |
| C08L 77/02 | (2006.01) |
| C08K 5/09 | (2006.01) |
| C08K 5/098 | (2006.01) |
| C08K 5/20 | (2006.01) |

(52) U.S. Cl.
CPC ....... *A63B 37/0094* (2013.01); *A63B 37/0006* (2013.01); *A63B 37/0024* (2013.01); *A63B 37/0037* (2013.01); *A63B 37/0039* (2013.01); *A63B 37/0049* (2013.01); *A63B 37/0051* (2013.01); *A63B 37/0069* (2013.01); *A63B 37/0075* (2013.01); *A63B 37/0076* (2013.01); *C08K 3/346* (2013.01); *C08K 5/09* (2013.01); *C08K 5/098* (2013.01); *C08K 5/20* (2013.01); *C08L 23/0876* (2013.01); *C08L 77/02* (2013.01); *A63B 37/0031* (2013.01); *A63B 37/0043* (2013.01); *A63B 37/0062* (2013.01)

(58) Field of Classification Search
None
See application file for complete search history.

(56) References Cited

U.S. PATENT DOCUMENTS

| 7,695,381 | B1* | 4/2010 | Sullivan | A63B 37/0003 473/378 |
| 2006/0063893 | A1* | 3/2006 | Rajagopalan | A63B 37/0004 525/418 |
| 2009/0264223 | A1* | 10/2009 | Tarao | A63B 37/0003 473/378 |
| 2009/0270203 | A1 | 10/2009 | Okabe | |
| 2010/0087275 | A1* | 4/2010 | Isogawa | A63B 37/0003 473/374 |
| 2010/0167841 | A1* | 7/2010 | Okabe | A63B 37/0003 473/373 |
| 2015/0119168 | A1* | 4/2015 | Inoue | A63B 37/0075 473/373 |

FOREIGN PATENT DOCUMENTS

| JP | 2000-119516 A | 4/2000 |
| JP | 2004-509200 A | 3/2004 |
| JP | 2009-261791 A | 11/2009 |
| JP | 2009-261792 A | 11/2009 |
| JP | 2010-017414 A | 1/2010 |
| JP | 2011-015763 A | 1/2011 |
| WO | WO 02/22729 A1 | 3/2002 |

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball traveling a great flight distance on driver shots. The present invention provides a golf ball wherein at least one constituting member therefore is formed from a golf ball resin composition containing: (A) a polyamide resin and (B) at least one member selected from the group consisting of (b-1) a binary copolymer composed of an olefin and an $\alpha,\beta$-unsaturated carboxylic acid having 3 to 8 carbon atoms, (b-2) a metal ion-neutralized product of a binary copolymer composed of an olefin and an $\alpha,\beta$-unsaturated carboxylic acid having 3 to 8 carbon atoms, (b-3) a ternary copolymer composed of an olefin, an $\alpha,\beta$-unsaturated carboxylic acid having 3 to 8 carbon atoms and an $\alpha,\beta$-unsaturated carboxylic acid ester, and (b-4) a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester, wherein the content of (A) component with respect to 100 mass % of a total of (A) component and (B) component is 15 mass % to 80 mass %, a slab hardness of the golf ball resin composition is 65 or more and 80 or less in Shore D hardness, and a value (X/A) obtained by dividing a flexural modulus X (MPa) by the content of (A) component (A: 15 mass % to 80 mass %) is 12.5 or more.

12 Claims, 2 Drawing Sheets

GOLF BALL RESIN COMPOSITION AND GOLF BALL USING THE SAME

FIELD OF THE INVENTION

The present invention relates to a golf ball resin composition having high resilience and a golf ball travelling a great flight distance on driver shots.

DESCRIPTION OF THE RELATED ART

As a three-piece golf ball or a multi-piece golf ball, a golf ball employing a highly rigid or highly elastic intermediate layer has been proposed.

For example, Japanese Patent Publication No. 2010-17414 A discloses a golf ball comprising a core consisting of a center and one or more intermediate layers covering the center, and a cover covering the core, wherein at least one piece or one layer of the intermediate layers is formed from a highly elastic intermediate layer composition containing: (A) a highly elastic polyamide resin having a flexural modulus of 700 MPa to 5000 MPa, (B) a metal-neutralized product of an ethylene-(meth)acrylic acid copolymer, and (C) a resin having a polar functional group, a content ratio (total: 100 mass %) of (A) the highly elastic polyamide resin to (B) the metal-neutralized product of the ethylene-(meth) acrylic acid copolymer is (A) highly elastic polyamide resin/(B) metal-neutralized product of ethylene-(meth) acrylic acid copolymer=20 mass % to 80 mass %/80 mass % to 20 mass %, and the content of (C) the resin having the polar functional group is 0.1 part by mass to 20 parts by mass with respect to a total of 100 parts by mass of (A) the highly elastic polyamide resin and (B) the metal-neutralized product of the ethylene-(meth)acrylic acid copolymer.

Japanese Patent Publication No. 2009-261791 A discloses a golf ball comprising a core consisting of a center and one or more intermediate layers covering the center, and a cover covering the core, wherein at least one piece or one layer of the intermediate layers is formed from a highly elastic intermediate layer composition containing: (A) a highly elastic resin having a flexural modulus of 700 MPa to 5000 MPa and (B) an ionomer resin having a flexural modulus of 150 MPa to 1000 MPa, and a content ratio (total: 100 mass %) of (A) the highly elastic resin to (B) the ionomer resin is (A) highly elastic resin/(B) ionomer resin=20 mass % to 80 mass %/80 mass % to 20 mass %.

Japanese Patent Publication No. 2009-261792 A discloses a golf ball comprising a core consisting of a center and one or more intermediate layers covering the center, and a cover covering the core, wherein at least one piece or one layer of the intermediate layers is formed from a highly rigid intermediate layer composition containing, as a resin component, (a) an ethylene-(meth)acrylic acid copolymer or a metal-neutralized product thereof, (b) a copolymer composed of an α-olefin and a glycidyl (meth)acrylate or a glycidyl unsaturated ether, (c) a polyolefin, and (d) an ionomer resin neutralized with a metal species different from that used for (a) the metal-neutralized product of the ethylene-(meth) acrylic acid copolymer, a mass ratio ((a+b+c)/d) of a total mass (a+b+c) of (a) the ethylene-(meth)acrylic acid copolymer or the metal-neutralized product thereof, (b) the copolymer composed of the α-olefin and the glycidyl (meth) acrylate or the glycidyl unsaturated ether, and (c) the polyolefin, to a mass of (d) the ionomer resin neutralized with the metal species different from that used for (a) the metal-neutralized product of the ethylene-(meth)acrylic acid copolymer in the resin component is 95 parts by mass/5 parts by mass to 50 parts by mass/50 parts by mass.

Japanese Patent Publication No. 2000-119516 A discloses a polyamide resin composition obtained by melting and kneading (A) a polyamide resin and (B) a layered silicate so as to the inorganic ash content in the composition being 0.1 to 50 wt %, wherein 40% or more of the total amino terminal groups in the polyamide resin form an ionic bond with the layered silicate in the composition.

Japanese Patent Publication No. 2004-509200 A discloses a polymer-organic day composite composition containing the following (A), (B), (C), (D), and (E):
(A) one or more types of organic thermoplastic polymers having an amine group;
(B) one or more types of organic clays containing an organic ammonium cation having a specific structure, and existing in an amount of approximately 0.1 wt % to approximately 40 wt % based on the total weight of the components (A), (B), (C), (D), and (E):
(C) a thermoplastic resin different from the component (A), and existing in an amount of approximately 0.0 to approximately 90 wt % based on the total weight of the components (A), (B), (C), (D), and (E);
(D) an impact modifier existing in an amount of approximately 0 to approximately 20 wt % based on the total weight of the components (A), (B), (C), (D), and (E); and
(E) a compatibilizer existing in an amount of approximately 0 to approximately 10 wt % based on the total weight of the components (A), (B), (C), (D), and (E).

Japanese Patent Publication No. 2011-15763 A discloses a golf ball resin composition containing: at least one type selected from a zinc ion-neutralized ionomer resin and a sodium ion-neutralized ionomer resin as an ionomer resin component, at least one type selected from a polyamide and a polyetheramine as a dispersant, and a clay, provided that the golf ball resin composition contains the polyamide as the dispersant in the case of containing the zinc ion-neutralized ionomer resin as the ionomer resin component, and contains the polyetheramine as the dispersant in the case of containing the sodium ion-neutralized ionomer resin.

SUMMARY OF THE INVENTION

One of the major demands for a golf ball is to improve its flight distance. As a method for improving a flight distance of a golf ball, a method using a highly rigid or highly elastic material is known. Among the highly rigid or highly elastic materials, a material that provides an even greater flight distance is desired.

The present invention has been made in view of the above described situation, and an object of the present invention is to provide a high resilience material which provides an even greater flight distance. Another object of the present invention is to provide a golf ball traveling a great flight distance on driver shots.

The golf ball resin composition of the present invention which can solve the above problem comprises: (A) a polyamide resin and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein a content of (A) component with respect to 100 mass % of a total of (A) component and (B) component ranges from 15 mass % to 80 mass %, a slab hardness of the golf ball resin composition is 65 or more and 80 or less in Shore D hardness, and a value (X/A) obtained by dividing a flexural modulus X (MPa) of the golf ball resin composition by the content of (A) component (A: 15 mass % to 80 mass %) is 12.5 or more.

The golf ball resin composition of the present invention is characterized in that the flexural modulus with respect to the content of the polyamide resin is extremely large, and the value (X/A) obtained by dividing the flexural modulus X (MPa) of the golf ball resin composition by the content of (A) component (A: 15 mass % to 80 mass %) is 12.5 or more. As a result, the golf ball using the golf ball resin composition of the present invention travels a great flight distance on driver shots.

The present invention includes a golf ball comprising a core, at least one intermediate layer covering the core, and a cover covering the intermediate layer, wherein at least one of the core, at least one intermediate layer or cover is formed from the golf ball resin composition of the present invention.

According to the present invention, a golf ball travelling a great flight distance on driver shots is obtained.

Figure 1:
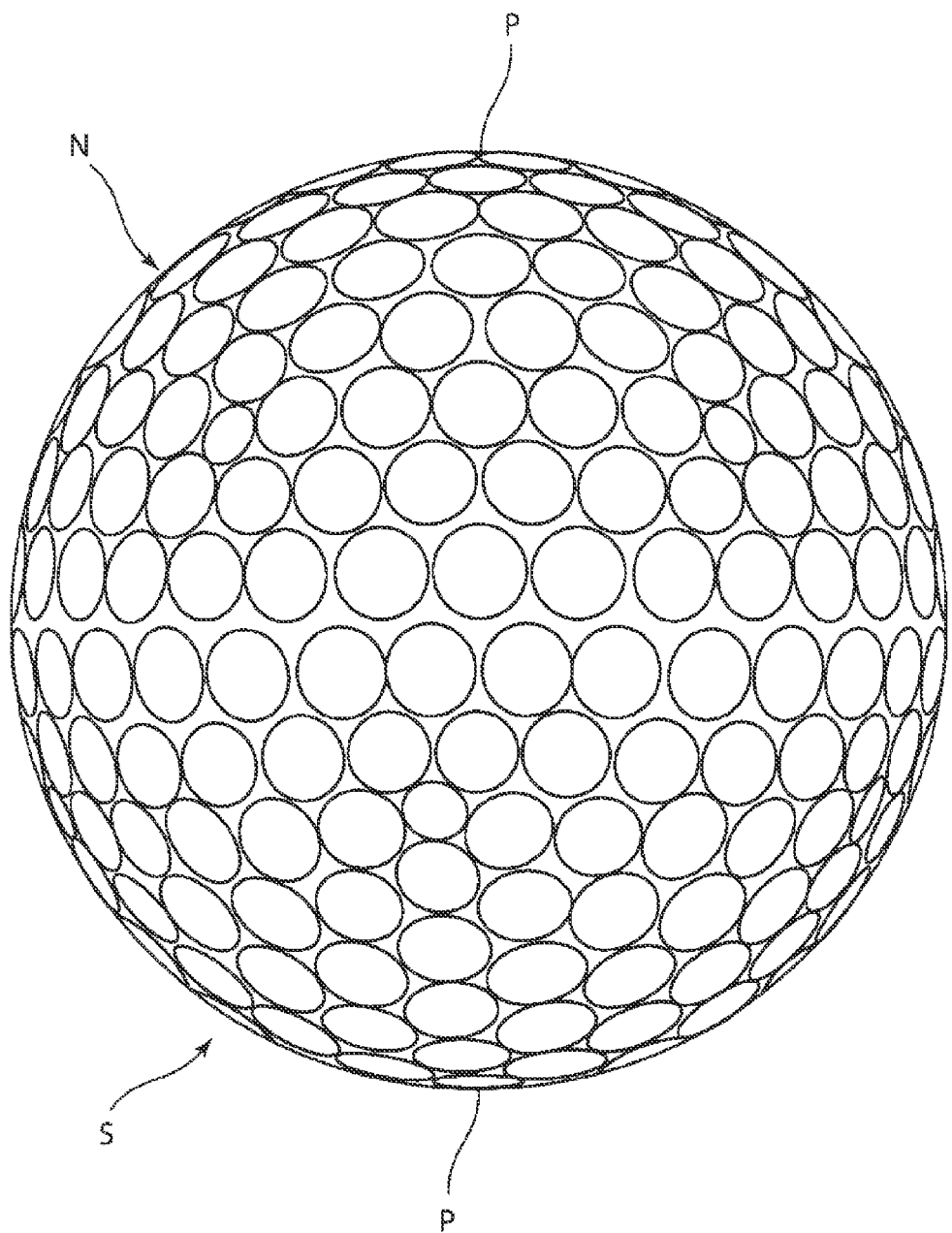
FIG. 1 is a front view of dimple patterns formed on the surface of the golf ball.

DESCRIPTION OF THE PREFERRED EMBODIMENT (1) Golf Ball Resin Composition

The golf ball resin composition of the present invention comprises: (A) a polyamide resin and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein a content of (A) component with respect to 100 mass % of a total of (A) component and (B) component ranges from 15 mass % to 80 mass %, a slab hardness of the golf ball resin composition is 65 or more and 80 or less in Shore D hardness, and a value (X/A) obtained by dividing a flexural modulus X (MPa) of the golf ball resin composition by the content of (A) component (A: 15 mass % to 80 mass %) is 12.5 or more.

Firstly, (A) the polyamide resin used in the present invention will be explained. (A) The polyamide resin is not particularly limited as long as it is a polymer having multiple amide bonds (—NH—CO—) in the main chain. Examples of the polyamide resin include products having amide bonds formed in the molecule through ring-opening polymerization of a lactam, a condensation reaction of amino acids, or a condensation reaction between a diamine component and a dicarboxylic acid component.

Examples of the lactam include ε-caprolactam, undecane lactam, and lauryl lactam. Examples of the amino acid include 6-aminocaproic acid, 11-aminoundecanoic acid, 12-aminododecanoic acid, and para-aminomethylbenzoic acid.

Examples of the diamine component include aliphatic diamines such as tetramethylene diamine, hexamethylene diamine, 2-methyl pentamethylene diamine, undecamethylene diamine, dodecamethylene diamine, 2,2,4-/2,4,4-trimethyl hexamethylene diamine, and 5-methyl nonamethylene diamine; aromatic diamines such as meta-xylylene diamine and para-xylylene diamine: and alicydcic diamines such as 1,3-bis(aminomethyl)cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethyl piperazine.

Examples of the dicarboxylic acid component include aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid.

Examples of (A) the polyamide resin include aliphatic polyamides such as Polyamide 6, Polyamide 11, Polyamide 12, Polyamide 66, Polyamide 610, and Polyamide 612; semi-aromatic polyamides such as Polyamide 6T, Polyamide 6I, Polyamide 9T, and Polyamide M5T; and aromatic polyamides such as poly-p-phenylene terephthalamide and poly-m-phenylene isophthalamide. Those polyamide resins may be used solely or in a combination of two or more. Among them, from a standpoint of processability and durability, the aliphatic polyamide such as Polyamide 6, Polyamide 66. Polyamide 11, and Polyamide 12 is suitable.

Specific examples of the polyamide resin in terms of trade names include: "Rilsan (Registered trademark) B (e.g., BESN TL, BESN P20 TL, BESN P40 TL, MB3610, BMF O, BMN O, BMN O TLD, BMN BK TLD, BMN P20 D, and BMN P40 D, etc.)" commercially available from Arkema K.K.; "Novamid (Registered trademark) (e.g., 1010C2, 1011CH5, 1013C5, 1010N2, 1010N2-2, 1010N2-1ES, 1013G(H)10-1, 1013G(H)15-1, 1013G(H)20-1, 1013G(H) 30-1, 1013(H)45-1, 1015G33, 1015GH35, 1015GSTH, 1010GN2-30, 1015F2, ST220, ST145, 3010SR, 3010N5-SL4, 3021G(H)30, 3010GN30, etc.)" commercially available from DSM Engineering Plastics Inc.; and "Amilan (Registered trademark) (e.g., CM1007. CM1017, CM1017XL3, CM1017K, CM1026, CM3007, CM3001-N, CM3006, CM3301L, etc.)" manufactured by Toray Industries Inc.

The melt flow rate (260° C., 325 g) of the polyamide resin measured in accordance with a method of ISO113 is preferably 5 g/min or more, more preferably 8 g/min or more, even more preferably 20 g/min or more, and is preferably 170 g/min or less, more preferably 150 g/10 min or less, even more preferably 120 g/10 min or less. If the melt flow rate (260° C., 325 g) of the polyamide resin is 5 g/10 min or more, fluidity becomes better, thus molding the polyamide resin into the constituting member of the golf ball becomes easier. In addition, if the melt flow rate (260° C., 325 g) of the polyamide resin is 170 g/10 min or less, durability of the resultant golf ball becomes better.

The flexural modulus of the polyamide resin measured in accordance with a method of ISO178 is preferably 500 MPa or more, more preferably 520 MPa or more, even more preferably 550 MPa or more, and is preferably 4,000 MPa or less, more preferably 3,500 MPa or less, even more preferably 3,200 MPa or less. If the flexural modulus of the polyamide resin is 500 MPa or more, the constituting member of the resultant golf ball has high resilience. As a result, the initial speed of the golf ball becomes high. In addition, if the flexural modulus of (A) the polyamide resin is 4,000 MPa or less, the constituting member of the resultant golf ball does not become excessively hard, thus excellent shot feeling and durability are obtained.

Although the degree of polymerization of the polyamide resin is not particularly limited, the relative viscosity of the polyamide resin measured in accordance with a method of ISO307 is preferably in a range of 1.5 to 5.0, and more preferably in a range of 2.0 to 4.0.

As the polyamide resin, for example, a polyamide resin having crystalline state and amorphous state in a coexisting manner is preferable. In this case, the degree of crystallinity of the polyamide resin is preferably 5% or more, more preferably 6% or more, even more preferably 6.5% or more, and is preferably 15% or less, more preferably 14% or less, even more preferably 13% or less. The degree of crystallinity X can be calculated from the following expression;

$$X=[dc(d-da)]/[d(dc-da)]$$

herein, dc: density of crystalline state, da: density of amorphous state, d: density of sample.

Next, (B) component used in the present invention will be explained. The golf ball resin composition of the present invention contains (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-saturated carboxylic acid having 3 to 8 carbon atoms and an α,β-unsaturated carboxylic acid ester.

(b-1) component is a nonionic binary copolymer composed of an olefin and an α,β-unsaturated carboxylic acid having 3 to 8 carbon atoms wherein carboxyl groups thereof are not neutralized. Further, (b-2) component includes an ionomer resin prepared by neutralizing at least a part of carboxyl groups in a binary copolymer composed of an olefin and α,β-unsaturated carboxylic acid having 3 to 8 carbon atoms with a metal ion.

(b-3) component is a nonionic ternary copolymer composed of an olefin, an α,β-unsaturated carboxylic acid having 3 to 8 carbon atoms and an α,β-unsaturated carboxylic acid ester wherein carboxyl groups thereof are not neutralized. Further, (b-4) component includes an ionomer resin prepared by neutralizing at least a part of carboxyl groups in a ternary copolymer composed of an olefin, α,β-unsaturated carboxylic acid having 3 to 8 carbon atoms and an α,β-unsaturated carboxylic acid ester with a metal ion.

In the present invention, "(b-1) the binary copolymer composed of an olefin and an α,β-unsaturated carboxylic acid having 3 to 8 carbon atoms" is sometimes merely referred to as "binary copolymer". "(b-2) the metal ion-neutralized product of a binary copolymer composed of an olefin and an α,β-unsaturated carboxylic acid having 3 to 8 carbon atoms" is sometimes merely referred to as "binary ionomer resin", "(b-3) the ternary copolymer composed of an olefin, an α,β-unsaturated carboxylic acid having 3 to 8 carbon atoms and an α,β-unsaturated carboxylic acid ester" is sometimes merely referred to as "ternary copolymer", and "(b-4) the metal ion-neutralized product of a ternary copolymer composed of an olefin, an α,β-unsaturated carboxylic acid having 3 to 8 carbon atoms and an α,β-unsaturated carboxylic acid ester" is sometimes merely referred to as "ternary ionomer resin".

The golf ball resin composition of the present invention preferably contains (b-2) the binary ionomer resin and/or (b-4) the ternary ionomer resin as (B) component. In the case that the golf ball resin composition of the present invention contains only (b-1) the binary copolymer and/or (b-3) the ternary copolymer as (B) component, the golf ball resin composition preferably further contains a metal compound. Neutralizing the carboxyl groups in (b-1) the binary copolymer and/or (b-3) the ternary copolymer with the metal compound in the golf ball resin composition provides substantially the same effect as using the binary ionomer resin and/or the ternary ionomer resin.

Examples of the metal compound used for neutralizing the carboxyl groups of (b-1) the binary copolymer and/or (b-3) the ternary copolymer include, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like.

The content of the α,β-unsaturated carboxylic acid having 3 to 8 carbon atoms in (B) component of the golf ball resin composition of the present invention is preferably 15 mass % or more, more preferably 16 mass % or more, and even more preferably 17 mass % or more. If the content of the acid component is 15 mass % or more, the resultant golf ball resin composition shows better resilience and hardness. The upper limit of the content of the α,β-unsaturated carboxylic acid having 3 to 8 carbon atoms is not particularly limited, but it is preferably 30 mass %, and more preferably 25 mass %.

The olefin preferably includes an olefin having 2 to 8 carbon atoms. Examples of the olefin include ethylene, propylene, butene, pentene, hexene, heptene, octane and the like. The olefin more preferably includes ethylene. Examples of the α,β-unsaturated carboxylic acid having 3 to 8 carbon atoms are acrylic acid, methacrylic acid, fumaric acid, maleic acid, crotonic acid and the like. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid and the like. In particular, acrylic acid ester and methacrylic acid ester are preferable.

(b-1) The binary copolymer preferably includes a binary copolymer composed of ethylene and (meth)acrylic acid. (b-2) The binary ionomer resin preferably includes a metal ion-neutralized product of a binary copolymer composed of ethylene-(meth)acrylic acid. (b-3) The ternary copolymer preferably includes a ternary copolymer composed of ethylene, (meth)acrylic acid and (meth)acrylic acid ester. (b-4)

The ternary ionomer resin preferably includes a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in (b-1) the binary copolymer or (b-3) the ternary copolymer is preferably 4 mass % or more, more preferably 5 mass % or more, and is preferably 30 mass % or less, more preferably 25 mass % or less.

The melt flow rate (190° C., 2.16 kgf) of (b-1) the binary copolymer or (b-3) the ternary copolymer is preferably 5 g/10 min or more, more preferably 10 g/10 min or more, even more preferably 15 g/10 min or more, and is preferably 1,700 g/10 min or less, more preferably 1,500 g/10 min or less, even more preferably 1.300 g/10 min or less. If the melt flow rate (190° C., 2.16 kgf) of (b-1) the binary copolymer or (b-3) the ternary copolymer is 5 g/10 min or more, the golf ball resin composition has better fluidity, and thus it is easier to mold a thin constituent member. If the melt flow rate (190° C., 2.16 kgf) of (b-1) the binary copolymer or (b-3) the ternary copolymer is 1,700 g/10 min or less, the resultant golf ball has better durability.

Specific examples of (b-1) the binary copolymer include an ethylene-methacrylic acid copolymer having a trade name of "NUCREL (registered trademark) (e.g. NUCREL N1050H, NUCREL N2050H, NUCREL AN4318, NUCREL N1110H, NUCREL N0200H)" commercially available from Du Pont-Mitsui Polychemicals Co., Ltd. and an ethylene-acrylic acid copolymer having a trade name of "PRIMACOR (registered trademark) 5980I" commercially available from Dow Chemical Company.

Specific examples of (b-3) the ternary copolymer include "NUCREL (registered trademark) (e.g. NUCREL AN4318, NUCREL AN4319)" commercially available from Du Pont-Mitsui Polychemicals Co., Ltd., "NUCREL (registered trademark) (e.g. NUCREL AE)" commercially available from E.I. du Pont de Nemours and Company, and "PRIMACOR (registered trademark) (e.g. PRIMCOR AT310, PRIMCOR AT320)" commercially available from Dow Chemical Company. (b-1) The binary copolymer or (b-3) the ternary copolymer may be used alone or as a mixture of at least two of them.

The content of the α,β-unsaturated carboxylic acid component having 3 to 8 carbon atoms in (b-2) the binary ionomer resin is preferably 15 mass % or more, more preferably 16 mass % or more, even more preferably 17 mass % or more, and is preferably 30 mass % or less, more preferably 25 mass % or less. If the content of the α,β-unsaturated carboxylic acid component having 3 to 8 carbon atoms is 15 mass % or more, the resultant constituent member has a desirable hardness. If the content of the α,β-unsaturated carboxylic acid component having 3 to 8 carbon atoms is 30 mass % or less, since the hardness of the resultant constituent member does not become excessively high, the durability and shot feeling become better.

The degree of neutralization of the carboxyl groups contained in (b-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, if the degree of neutralization is 90 mole % or less, the golf ball resin composition has better fluidity (good moldability). The degree of neutralization of the carboxyl groups contained in (b-2) the binary ionomer resin can be calculated by the following expression.

Degree of neutralization (mole %) of the binary ionomer resin=(the number of moles of carboxyl groups neutralized in the binary ionomer resin/the number of moles of all carboxyl groups contained in the binary ionomer resin)×100

Examples of the metal ion used for neutralizing at least a part of carboxyl groups of (b-2) the binary ionomer resin include: monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like. As (b-2) the binary ionomer resin, a mixture of a binary ionomer resin neutralized with sodium and a binary ionomer resin neutralized with zinc is preferably used. By using the mixture, good resilience and durability can be obtained together.

Specific examples of (b-2) the binary ionomer resin include "Himilan (registered trademark) (e.g. Himilan 1555 (Na), Himilan 1557 (Zn), imilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(b-2) The binary ionomer resins exemplified above may be used alone or as a mixture of at least two of them. It is noted that Na, Zn, Li, Mg and the like described in the parentheses after the trade names indicate metal types of neutralizing metal ions of the binary ionomer resins.

(b-2) The binary ionomer resin preferably has a flexural modulus of 140 MPa or more, more preferably 150 MPa or more, even more preferably 160 MPa or more, and preferably has a flexural modulus of 550 MPa or less, more preferably 500 MPa or less, even more preferably 450 MPa or less. If the flexural modulus of (b-2) the binary ionomer resin falls within the above range, the flight performance of the resultant golf ball is excellent because of the optimized spin rate on driver shots, and the durability of the resultant golf ball becomes better.

(b-2) The binary ionomer resin preferably has a melt flow rate (190° C., 2.16 kgf) of 0.1 g/10 min or more, more preferably 0.5 g/10 min or more, even more preferably 1.0 g/10 min or more, and preferably has a melt flow rate (190° C., 2.16 kgf) of 30 g/10 min or less, more preferably 20 g/10 min or less, even more preferably 15 g/10 min or less. If the melt flow rate (190° C., 2.16 kgf) of (b-2) the binary ionomer resin is 0.1 g/10 min or more, the golf ball resin composition has better fluidity and thus, for example, it is possible to mold a thin constituent member. If the melt flow rate (190° C., 2.16 kgf) of (b-2) the binary ionomer resin is 30 g/10 min or less, the durability of the resultant golf ball becomes better.

(b-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. On the other hand, if the binary ionomer resin has a slab hardness of 75 or less in Shore D hardness, the resultant constituent member does not become excessively hard, and thus the golf ball has better durability.

The content of the α,β-unsaturated carboxylic acid having 3 to 8 carbon atoms in (b-4) the ternary ionomer resin is preferably 2 mass % or more, more preferably 3 mass % or more, and is preferably 30 mass % or less, more preferably 25 mass % or less.

The degree of neutralization of the carboxyl groups contained in (b-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the golf ball resin composition of the present invention has better resilience and durability. If the degree of neutralization is 90 mole % or less, the golf ball resin composition has better fluidity (good moldability). The degree of neutralization of the carboxyl groups in the ionomer resin can be calculated by the following expression.

Degree of neutralization (mole %) of the ionomer resin=(the number of moles of carboxyl groups neutralized in the ionomer resin/the number of moles of all carboxyl groups contained in the ionomer resin)×100

Examples of the metal ion used for neutralizing at least a part of carboxyl groups of (b-4) the ternary ionomer resin include: monovalent metal ions such as sodium, potassium, lithium and the like: divalent metals ions such as magnesium, calcium, zinc, barium, cadmium and the like; trivalent metals ions such as aluminum and the like; and other ions such as tin, zirconium and the like.

Specific examples of (b-4) the ternary ionomer resin include "Himilan (registered trademark) (e.g. Himilan AM7327 (Zn), Himilan 1855 (Zn), Himilan 1856 (Na), Himilan AM7331 (Na) and the like)" commercially available from Du Pont-Mitsui Polychemicals Co., Ltd. Further, the ternary ionomer resins commercially available from E.I. du Pont de Nemours and Company include "Surlyn 6320 (Mg), Surlyn 8120 (Na), Surlyn 8320 (Na), Surlyn 9320 (Zn), Surlyn 9320W (Zn) and the like". The ternary ionomer resins commercially available from ExxonMobil Chemical Corporation include "Iotek 7510 (Zn), Iotek 7520 (Zn) and the like". It is noted that Na, Zn, Mg and the like described in the parentheses after the trade names indicate metal types of neutralizing metal ions. (b-4) The ternary ionomer resins may be used alone or as a mixture of at least two of them.

(b-4) The ternary ionomer resin preferably has a flexural modulus of 10 MPa or more, more preferably 11 MPa or more, even more preferably 12 MPa or more, and preferably has a flexural modulus of 100 MPa or less, more preferably 97 MPa or less, even more preferably 95 MPa or less. If the flexural modulus of (b-4) the binary ionomer resin falls within the above range, the flight performance of the resultant golf ball is excellent because of the optimized spin rate on driver shots, and the durability of the resultant golf ball becomes better.

(b-4) The ternary ionomer resin preferably has a melt flow rate (190° C., 2.16 kgf) of 0.1 g/10 min or more, more preferably 0.3 g/10 min or more, even more preferably 0.5 g/10 min or more, and preferably has a melt flow rate (190° C., 2.16 kgf) of 20 g/10 min or less, more preferably 15 g/10 min or less, even more preferably 10 g/10 min or less. If the melt flow rate (190° C., 2.16 kgf) of (b-4) the ternary ionomer resin is 0.1 g/10 min or more, the golf ball resin composition has better fluidity and thus it is possible to mold a thin constituent member. If the melt flow rate (190° C., 2.16 kgf) of (b-4) the ternary ionomer resin is 20 g/10 min or less, the durability of the resultant golf ball becomes better.

(b-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has better resilience. If the ternary ionomer resin has a slab hardness of 70 or less in Shore D hardness, the resultant constituent member does not become excessively hard and thus the golf ball has better durability.

In the golf ball resin composition of the present invention, the mass ratio of (A) component to (B) component ((A/(B)) preferably ranges from 15/85 to 80/20, more preferably ranges from 20/80 to 75/25, even more preferably ranges from 25/75 to 70/30. If the mass ratio of (A) component to (B) component falls within the above range, the spin rate on driver shots is lowered because of the high flexural modulus, and rebound resilience becomes better, thus the flight distance on driver shots becomes great. Moreover, the durability of the resultant golf ball becomes better.

The golf ball resin composition of the present invention preferably further contains (C) an organically modified layered silicate. (C) The organically modified layered silicate used in the present invention will be explained. A layered silicate is a silicate having a layered structure. An organically modified layered silicate is the one that is obtained by exchanging, with an organic onium ion, a part of or all the metal cations originally included between crystal layers in a layered silicate.

The layered silicate is not particularly limited as long as it is a silicate having a layered structure, and examples thereof include: layered silicates of kaolinites such as kaolinite, dickite, halloysite, chrysotile, lizardite, and amesite; layered silicates of smectites such as montmorillonite, beidellite, nontronite, saponite, ferrous saponite, hectorite, sauconite, and stevensite; layered silicates of vermiculites such as dioctahedral vermiculite and trioctahedral vermiculite; layered silicates of micas such as white mica, paragonite, phlogopite, biotite, and lepidolite; layered silicates of brittle micas such as margarite, dintonite, and anandite; and layered silicates of chlorites such as cookeite, sudoite, dclinochlore, chamosite, and nimite. These layered silicates may be natural or synthetic, and may be used solely or as a mixture of two or more types. Among them, examples of the layered silicate preferably used in the present invention include: layered silicates of smectites such as montmorillonite, beidellite, nontronite, saponite, ferrous saponite, hectorite, sauconite, and stevensite; layered silicates of vermiculites such as dioctahedral vermiculite and trioctahedral vermiculite; and layered silicates of micas such as white mica, paragonite, phlogopite, biotite, and lepidolite. Montmorillonite and layered silicates of micas are particularly suitable.

Each layer (primary particle) constituting the layered silicate is preferably a nano size fine particle having a thickness of 10 nm or less, and preferably has a plate-like shape whose length and width are both 1 μm or less. Although the size of the layered silicate is not particularly limited, it is preferably 1 μm or less, more preferably 700 nm or less, even more preferably 500 nm or less.

The cation exchange capacity of the layered silicate is preferably 30 meq/100 g or more, more preferably 40 meq/100 g or more, even more preferably 50 meq/100 g or more, and is preferably 200 meq/100 g or less, more preferably 180 meq/100 g or less, even more preferably 160 meq/100 g or less. If the cation exchange capacity is 30 meq/100 g or more, exchange with an organic onium ion can be performed sufficiently during organic modification and the interlayer distance can be expanded to a desired interval. If the cation exchange capacity is 200 meq/100 g or less, bonding strength between crystal layers does not become excessively strong, thus the interlayer distance can be expanded easily. It should be noted that the cation exchange capacity is an amount of exchangeable cations contained in per unit mass of the layered silicate.

The ion exchange ratio in the organically modified layered silicate is preferably 50 mol % or more, more preferably 60 mol % or more, even more preferably 70 mol % or more. If the ion exchange ratio in the organically modified layered silicate is 50 mol % or more, dispersibility of the organically modified layered silicate in the resin component can be improved. Here, the ion exchange ratio in the organically modified layered silicate is a ratio (percentage) indicating, among the exchangeable cations contained in the layered silicate prior to organic modification, how much the cations were exchanged with organic cations.

The organic onium ion used for organically modifying the layered silicate is a cation having a carbon chain. The organic onium ion is not particularly limited, and examples thereof include organic ammonium ions, organic phosphonium ions, and organic sulfonium ions.

As the organic ammonium ion, any one of primary ammonium ion, secondary ammonium ion, tertiary ammonium ion, and quaternary ammonium ion may be used.

Examples of the primary ammonium ion include decyl ammonium ion, dodecyl ammonium ion, octadecyl ammonium ion, oleyl ammonium ion, and benzyl ammonium ion.

Examples of the secondary ammonium ion include methyl dodecyl ammonium ion and methyl octadecyl ammonium ion.

Examples of the tertiary ammonium ion include dimethyl dodecyl ammonium ion and dimethyl octadecyl ammonium ion.

Examples of the quaternary ammonium ion include: benzyl trialkyl ammonium ions such as benzyl trimethyl ammonium ion, benzyl triethyl ammonium ion, benzyl tributyl ammonium ion, benzyl dimethyl dodecyl ammonium ion, and benzyl dimethyl octadecyl ammonium ion; alkyl trimethyl ammonium ions such as trioctyl methyl ammonium ion, trimethyl octyl ammonium ion, trimethyl dodecyl ammonium ion, and trimethyl octadecyl ammonium ion; and dimethyl dialkyl ammonium ions such as dimethyl dioctyl ammonium ion, dimethyl didodecyl ammonium ion, and dimethyl dioctadecyl ammonium ion.

Other than those described above, examples of the organic ammonium ion also include ammonium ions such as aniline, p-phenylene diamine, α-naphthylamine, p-aminodimethyl aniline, benzidine, pyridine, piperidine, and 6-aminocaproic acid.

Among the ammonium ions described above, a quaternary ammonium ion having a total of 11 to 30 intramolecular carbon atoms is particularly suitable from a standpoint of dispersibility of the layered silicate and formability of ionic bonds. Specific examples thereof include octadecyl ammonium ion, trioctyl methyl ammonium ion, trimethyl octadecyl ammonium ion, benzyl dimethyl dodecyl ammonium ion, and benzyl dimethyl octadecyl ammonium ion.

The organically modified layered silicate, whose exchangeable cations existing between layers were exchanged with an organic onium ion, of the present invention can be produced by causing a reaction between an organic onium ion and a layered silicate having exchangeable metal ions between layers thereof with a method known in the art. Specific examples of such a method include a method of performing an ion exchange reaction in a polar solvent such as water, methanol, and ethanol; and a method of causing a direct reaction between a liquid or melted ammonium salt and a layered silicate.

The layered silicate may be pretreated with, in addition to the organic onium ion described above, a coupling agent such as an isocyanate compound, an organic silane compound, an organic titanate compound, an organoborane compound, and an epoxy compound.

The preferable coupling agent is the organic silane compound, and specific examples thereof include epoxy group-containing alkoxysilane compounds such as γ-glycidoxypropyl trimethoxysilane, γ-glycidoxypropyl triethoxysilane, and β-(3,4-epoxycyclohexyl)ethyl trimethoxysilane; mercapto group-containing alkoxysilane compounds such as γ-mercaptopropyl trimethoxysilane and γ-mercaptopropyl triethoxysilane; ureido group-containing alkoxysilane compounds such as γ-ureidopropyl triethoxysilane, γ-ureidopropyl trimethoxysilane, and γ-(2-ureidoethyl)aminopropyl trimethoxysilane; isocyanato group-containing alkoxysilane compounds such as γ-isocyanatopropyl triethoxysilane, γ-isocyanatopropyl trimethoxysilane, γ-isocyanatopropylmethyl dimethoxysilane, γ-isocyanatopropylmethyl diethoxysilane, γ-isocyanatopropyl ethyl dimethoxysilane, γ-isocyanatopropyl ethyl diethoxysilane, and γ-isocyanatopropyl trichlorosilane; amino group-containing alkoxysilane compounds such as γ-(2-aminoethyl)aminopropylmethyl dimethoxysilane, γ-(2-aminoethyl)aminopropyl trimethoxysilane, and γ-aminopropyl trimethoxysilane; hydroxyl group-containing alkoxysilane compounds such as γ-hydroxypropyl trimethoxysilane and γ-hydroxypropyl triethoxysilane; and carbon-carbon unsaturated group-containing alkoxysilane compounds such as γ-methacryloxypropyl trimethoxysilane, vinyl trimethoxysilane, and N-β-(N-vinylbenzylaminoethyl)-γ-aminopropyl trimethoxysilane hydrochloride. In particular, the carbon-carbon unsaturated group-containing alkoxysilane compound is used preferably.

Treatment of the layered silicate with the coupling agent may be performed using any one of a method of causing the coupling agent to be adsorbed by the layered silicate in a polar solvent such as water, methanol and ethanol, or in a mixed solvent thereof; a method of dripping the coupling agent solution to the layered silicate which is being stirred in a high-speed agitation mixing machine such as a Henschel mixer to cause the coupling agent to be absorbed by the layered silicate; and a method of adding the silane coupling agent directly to the layered silicate and mixing the mixture with a mortar or the like to cause the coupling agent to be absorbed by the layered silicate. In case of treating the layered silicate with the coupling agent, water, acidic water, alkaline water, or the like is preferably blended simultaneously in order to accelerate hydrolysis of alkoxy groups in the coupling agent. Furthermore, in order to enhance reaction efficiency of the coupling agent, in addition to water, an organic solvent such as methanol and ethanol that dissolves both water and the coupling agent may be blended. The reaction may be further accelerated by heat-treating such layered silicate which has been treated with the coupling agent. In addition, instead of treating the layered silicate with the coupling agent in advance, a so-called integral blending method of adding the coupling agent when melting and kneading the layered silicate and the thermoplastic polyamide resin may be used.

Although the order of treating the layered silicate with the organic onium ion and treating the layered silicate with the coupling agent is not particularly limited, it is preferred that the layered silicate is treated with the coupling agent after treated with the organic onium ion.

Specific examples of the organically modified layered silicate include: "Dellite (Registered trademark) 43B (refined montmorillonite, particle diameter: 500 nm, thickness: 1 nm, quaternary ammonium salt treated: quaternary ammonium salt having a benzyl group, a tallowate group and two methyl groups)" and "Dellite (Registered trademark) 67G (refined montmorillonite, particle diameter 500 nm, thickness: 1 nm, quaternary ammonium salt treated: quaternary ammonium salt having two tallowate groups and two methyl groups)" commercially available from Laviosa Chimica Mineraria S.p.A; and "S-Ben" manufactured by HOJUN Co., Ltd.

When the golf ball resin composition of the present invention contains (C) the organically modified layered silicate, the content of (C) the organically modified layered silicate is preferably 0.1 parts by mass or more, more preferably 0.12 parts by mass or more, even more preferably 0.15 parts by mass or more, and is preferably 50 parts by mass or less, more preferably 30 parts by mass or less, even more preferably 20 parts by mass or less, with respect to 100 parts by mass of a total of (A) component and (B) component. If the content of the organically modified layered silicate falls within the above range, the physical property improving effect obtained by the addition becomes better, and decrease in toughness can be suppressed. By containing (C) the organically modified layered silicate in the golf ball resin composition, the flexural modulus improves and spin rate on driver shots decreases, thus flight distance on driver shots can be increased.

The golf ball resin composition of the present invention may further contain (D) an organic onium salt as necessary. (D) The organic onium salt is a compound group represented by ammonium salts, phosphonium salts, and sulfonium salts. Among them, the ammonium salt and the phosphonium salt are preferably used, in particular the ammonium salt is preferably used. As the ammonium salt, any one of chloride, bromide, acetate, and sulfate of a primary ammonium, a secondary ammonium, a tertiary ammonium and a quaternary ammonium may be used.

Examples of the primary ammonium salt include salts of decyl ammonium, dodecyl ammonium, octadecyl ammonium, oleyl ammonium, and benzyl ammonium.

Examples of the secondary ammonium salt include salts of methyl dodecyl ammonium and methyl octadecyl ammonium.

Examples of the tertiary ammonium salt include salts of dimethyl dodecyl ammonium and dimethyl octadecyl ammonium.

Examples of the quaternary ammonium salt include: benzyl trialkyl ammonium salts of benzyl trimethyl ammonium, benzyl triethyl ammonium, benzyl tributyl ammonium, benzyl dimethyl dodecyl ammonium, and benzyl dimethyl octadecyl ammonium; alkyl trimethyl ammonium salts of trioctyl methyl ammonium, trimethyl octyl ammonium, trimethyl dodecyl ammonium, and trimethyl octadecyl ammonium; and dimethyl dialkyl ammonium salts of dimethyl dioctyl ammonium, dimethyl didodecyl ammonium, and dimethyl dioctadecyl ammonium.

In addition to those described above, examples of the ammonium salt also include ammonium salts of aniline, p-phenylene diamine, α-naphthylamine, p-aminodimethyl aniline, benzidine, pyridine, piperidine, 6-aminocaproic acid, 11-aminoundecanoic acid, and 12-aminododecanoic acid.

Among the ammonium salts described above, trioctyl methyl ammonium chloride, trimethyl octadecyl ammonium chloride, benzyl dimethyl dodecyl ammonium chloride, and benzyl dimethyl octadecyl ammonium chloride may be suitably used.

The organic onium ion used for organically modifying the layered silicate and the organic onium ion forming the organic onium salt which is used as (D) component may be the same or may be different. In the case where the same organic onium ion is used, the organic onium salt may be added in an excessive amount when producing the organically modified layered silicate which is (C) component, to keep the organic onium salt remain in (C) component.

From a standpoint of physical properties of the resultant resin composition and gas generation, the blended amount of the organic ammonium salt when the organic ammonium salt is blended as (D) the organic onium salt is preferably in a range of 0.01 part by mass to 10 parts by mass, more preferably in a range of 0.05 part by mass to 5 parts by mass, and particularly preferably in a range of 0.1 part by mass to 3 parts by mass, with respect to 100 parts by mass of (A) the polyamide resin.

The golf ball resin composition of the present invention may further contain a fluidity modifier. Examples of the fluidity modifier include fatty acids and/or metal salts thereof.

The fatty acid is not particularly limited, and examples thereof include: saturated fatty acids such as butyric acid, valeric acid, hexanoic acid, heptanoic acid, octanoic acid, pelargonic acid, decanoic acid, lauric acid, myristic acid, palmitic acid, heptadecanoic acid, stearic acid, icosanoic acid, behenic acid, lignoceric acid, and cerotic acid; and unsaturated fatty acids such as palmitoleic acid, oleic acid, linolic acid, α-linolenic acid, γ-linolenic acid, and arachidonic acid.

The fatty acid metal salt is not particularly limited, and examples thereof include metal salts of the aforementioned fatty acids. Examples of the fatty acid metal salt include: monovalent metal salts such as fatty acid sodium salts, fatty acid potassium salts, and fatty acid lithium salts; divalent metal salts such as fatty acid magnesium salts, fatty acid calcium salts, fatty acid zinc salts, fatty acid barium salts, and fatty acid cadmium salts; and trivalent metal salts such as fatty acid aluminum salts. Among them, as the fatty acid metal salt, divalent metal salts of saturated fatty acids such as magnesium stearate, calcium stearate, zinc stearate, barium stearate, and copper stearate are preferable.

The blended amount of the fluidity modifier is preferably 0.5 part by mass or more, more preferably 1.5 parts by mass or more, and is preferably 30 parts by mass or less, more preferably 25 parts by mass or less, with respect to 100 parts by mass of a total of (A) component and (B) component. If the blended amount of the fluidity modifier falls within the above range, the fluidity of the golf ball resin composition improves. As a result, molding a thin constituting member becomes possible.

The golf ball resin composition of the present invention may further contain a pigment component such as a white pigment (for example, titanium oxide) and a blue pigment, a weight adjusting agent, a dispersant an antioxidant, an ultraviolet absorber, a light stabilizer, a fluorescent material, a fluorescent brightener, and the like, as long as they do not impair the performance of the golf ball.

The golf ball resin composition of the present invention can be obtained, for example, by dry blending (A) component, (B) component, and (C) component as necessary. Further, the dry blended mixture may be extruded into a pellet form. The dry blending is preferably carried out by using for example, a mixer capable of blending raw materials in a pellet form, and is more preferably carried out by using a tumbler type mixer. Extruding can be carried out by using publicly known extruders such as a single-screw extruder, a twin-screw extruder, a twin-single screw extruder, and the like.

The golf ball resin composition of the present invention preferably has a melt flow rate (240° C., 2.16 kgf) of 5 g/10 min or more, more preferably 8 g/10 min or more, even more preferably 10 g/10 min or more, and preferably has a melt flow rate (240° C., 2.16 kgf) of 100 g/10 min or less, more preferably 70 g/10 min or less, even more preferably 40 g/10 min or less. If the golf ball resin composition has a melt flow rate in the above range, the moldability is good.

The golf ball resin composition of the present invention preferably has a slab hardness of 65 or more, more preferably 67 or more, even more preferably 69 or more in shore D hardness, and the golf ball resin composition preferably has a slab hardness of 80 or less, more preferably 78 or less, even more preferably 76 or less in shore D hardness. By using the golf ball resin composition having a slab hardness of 65 or more in shore D hardness, the spherical body consisting of the core and the intermediate layer has an outer-hard inner-soft structure, thus the golf ball showing a higher launch angle and low spin rate on driver shots can be obtained. As a result, the flight distance of the golf ball on driver shots becomes larger. On the other hand, by using the golf ball resin composition having a slab hardness of 80 or less in shore D hardness, the golf ball excellent in the durability can be provided. Here, the slab hardness of the golf ball resin composition is a hardness of the golf ball resin composition that is molded into a sheet form, and is measured by the method described later.

The golf ball resin composition of the present invention preferably has a flexural modulus X (MPa) of 400 MPa or more, more preferably 430 MPa or more, even more preferably 450 MPa or more, and preferably has a flexural modulus of 4,000 MPa or less, more preferably 3,500 MPa or less, even more preferably 3,000 MPa or less. If the flexural modulus of the golf ball resin composition is 400 MPa or more, the obtained golf ball has an outer-hard inner-soft structure and thus the flight distance become larger. On the other hand, if the flexural modulus of the golf ball resin composition is 4,000 MPa or less, the obtained golf ball becomes appropriately soft and thus the shot feeling becomes better.

The golf ball resin composition of the present invention is characterized in that the flexural modulus with respect to the content of the polyamide resin is large. The value (X/A) obtained by dividing the flexural modulus X (MPa) by the content of (A) component (A: 15 mass % to 80 mass %) is 12.5 or more, preferably 14 or more, more preferably 16 or more. If the value (X/A) obtained by dividing the flexural modulus X (MPa) by the content of (A) component (A: 15 mass % to 80 mass %) is 12.5 or more, high resilience and adequate durability are obtained. The upper limit of the value (X/A) obtained by dividing the flexural modulus X (MPa) by the content of (A) component (A: 15 mass % to 80 mass %) is not particularly limited, but is preferably 35.

The golf ball resin composition of the present invention preferably has a rebound resilience (%) of 48 or more, more preferably 49 or more, even more preferably 50 or more. If the rebound resilience (%) of the golf ball resin composition is 48 or more, the obtained golf ball has a higher resilience and thus the flight distance becomes larger.

The melt flow rate, flexural modulus, rebound resilience and slab hardness of the golf ball resin composition can be adjusted by choosing appropriately the kinds, contents, or the like of (A) component, (B) component and (C) component (2) Golf Ball The golf ball of the present invention comprises a core, at least one intermediate layer covering the core, and a cover covering the intermediate layer, wherein at least one of the core, at least one intermediate layer or cover is formed from the golf ball resin composition of the present invention. In one preferable embodiment, the golf ball comprises a core, at least one intermediate layer covering the core, and a cover covering the intermediate layer, wherein at least one intermediate layer is formed from the golf ball resin composition of the present invention.

In the following, the golf ball of the present invention will be explained based on the preferable embodiment that comprises a core, at least one intermediate layer covering the core, and a cover covering the intermediate layer (including a three-piece golf ball), wherein at least one intermediate layer is formed from the golf ball resin composition of the present invention.

Core Material

The core generally has a spherical shape, but may be an irregular core provided with a rib on the surface thereof so that the surface of the spherical core is divided by the ribs. A rubber composition (hereinafter, sometimes simply referred to as "core rubber composition") may be employed for the core. The core can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and an ethylene-propylene-diene rubber (EPDM). Among them, particularly preferred is the high cis-polybutadiene having cis-bond in a proportion of 40 mass % or more, more preferably 70 mass % or more, even more preferably 90 mass % or more in view of its superior resilience.

The crosslinking initiator is blended to crosslink the base rubber component. As the crosslinking initiator, an organic peroxide is preferably used. Examples of the organic peroxide are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. The amount of the crosslinking initiator to be blended in the rubber composition is preferably 0.3 part by mass or more, more preferably 0.4 part by mass or more, and is preferably 5 parts by mass or less, more preferably 3 parts by mass or less with respect to 100 parts by mass of the base rubber. If the amount is less than 0.3 part by mass, the core becomes too soft, and the resilience tends to be lowered, and if the amount is more than 5 parts by mass, the amount of the co-crosslinking agent must be lowered in order to obtain an appropriate hardness, which tends to cause the insufficient resilience.

The co-crosslinking agent is not particularly limited so long as it has an action of crosslinking a rubber molecule by graft polymerization to a base rubber molecular chain, for example, an α,β-unsaturated carboxylic acid having 3 to 8 carbon atoms or a metal salt thereof can be used, the preferable examples include acrylic acid, methacrylic acid or a metal salt thereof. As the metal constituting the metal salt, for example, zinc, magnesium, calcium, aluminum and sodium may be used, and among them, zinc is preferred because it provides high resilience.

The amount of the co-crosslinking agent to be used is preferably 10 parts by mass or more, more preferably 15 parts by mass or more, even more preferably 20 parts by mass or more, and is preferably 55 parts by mass or less, more preferably 50 parts by mass or less, even more preferably 48 parts by mass or less, with respect to 100 parts by mass of the base rubber. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the core becomes so hard that the shot feeling may be lowered.

The filler contained in the core rubber composition is mainly blended as a weight adjusting agent in order to adjust the weight of the golf ball obtained as the final product, and may be blended as necessary. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part by mass or more, more preferably 1 part by mass or more, and is preferably 30 parts by mass or less, more preferably 20 parts by mass or less, with respect to 100 parts by mass of the base rubber. If the amount of the filler to be blended is less than 0.5 part by mass, it becomes difficult to adjust the weight, while if it is more than 30 parts by mass, the weight ratio of the rubber component becomes small and the resilience tends to be lowered.

In the core rubber composition, an organic sulfur compound, an antioxidant or a peptizing agent may be blended appropriately in addition to the base rubber, the crosslinking initiator, the co-crosslinking agent and the filler.

Examples of the organic sulfur compound include thiophenols, thionaphthols, polysulfides, thiocarboxylic acids, dthiocarboxylic acids, sulfenamindes, thiurams, dithiocarbamates, thiazoles, and the like.

Among them, diphenyl disulfides may be preferably used as the organic sulfur compound. Examples of the diphenyl disulfides include diphenyl disulfide; mono-substituted diphenyl disulfides such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; di-substituted diphenyl disulfides such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; tri-substituted diphenyl disulfides such as bis(2,4,6-trichlorophenyl)disulfide, and bis(2-cyano-4-chloro-6-bromophenyl) disulfide; tetra-substituted diphenyl disulfides such as bis(2, 3,5,6-tetra chlorophenyl)disulfide; penta-substituted diphenyl disulfides such as bis(2,3,4,5,6-pentachlorophenyl) disulfide and bis(2,3,4,5,6-pentabromophenyl)disulfide. These diphenyl disulfides can enhance resilience by having some influence on the state of vulcanization of vulcanized rubber. Among them, diphenyl disulfide or bis(pentabromophenyl)disulfide is preferably used since the golf ball having particularly high resilience can be obtained. The amount of the organic sulfur compound to be blended is preferably 0.1 part by mass or more, more preferably 0.3 part by mass or more, and is preferably 5.0 parts by mass or less, more preferably 3.0 parts by mass or less with respect to 100 parts by mass of the base rubber.

The amount of the antioxidant to be blended is preferably 0.1 part by mass or more and is preferably 1 part by mass or less with respect to 100 parts by mass of the base rubber. Further, the amount of the peptizing agent to be blended is preferably 0.1 part by mass or more and is preferably 5 parts by mass or less with respect to 100 parts of the base rubber.

Cover Material

The cover of the golf ball of the present invention is preferably formed from a cover composition containing a resin component. The examples of the resin component include: an ionomer resin such as "Himilan" commercially available from Du Pont-Mitsui Polychemicals Co., Ltd., "Surlyn" commercially available from E.I. du Pont de Nemours and Company, and "Iotek" commercially available from ExxonMobil Chemical Corporation; a thermoplastic polyurethane elastomer having a trade name of "Elastollan (registered trademark) (e.g. Elastollan XNY85A, Elastollan XNY97A)" commercially available from BASF Japan Ltd.; a thermoplastic polyamide elastomer having a trade name of "Pebax (registered trademark) (e.g. Pebax 2533)" commercially available from Arkema K. K.; a thermoplastic polyester elastomer having a trade name of "Hytrel (registered trademark) (e.g. Hytrel 3548, Hytrel 4047)" commercially available from Du Pont-Toray Co., Ltd.; and a thermoplastic styrene elastomer having a trade name of "Rabalon (registered trademark)" commercially available from Mitsubishi Chemical Corporation. In addition, (B) component, namely, (b-1) the binary copolymer composed of an olefin and an α,β-unsaturated carboxylic acid having 3 to 8 carbon atoms, or (b-3) the ternary copolymer composed of an olefin, an α,β-unsaturated carboxylic acid having 3 to 8 carbon atoms and an α,β-unsaturated carboxylic acid ester may be used. These resin components may be used solely or as a mixture of at least two of them.

The cover composition preferably contains the thermoplastic polyurethane elastomer or the ionomer resin, as the resin component. The content of the thermoplastic polyurethane elastomer or the ionomer resin in the resin component of the cover composition is preferably 50 mass % or more, more preferably 60 mass % or more, even more preferably 70 mass % or more. In one preferable embodiment the cover composition contains the thermoplastic polyurethane elastomer. By using the polyurethane cover, controllability on approach shots can be improved.

In addition to the aforementioned resin component, the cover composition may further contain a pigment component such as a white pigment (for example, titanium oxide), a blue pigment, a red pigment, or the like: a weight adjusting agent such as zinc oxide, calcium carbonate, barium sulfate, or the like; a dispersant an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

The cover composition preferably has a slab hardness of 65 or less, more preferably 60 or less, even more preferably 55 or less in Shore D hardness. If the cover composition has a slab hardness of 65 or less, the spin rate on approach shots with short irons increases. As a result, the golf ball having a good controllability on approach shots is obtained. In order to ensure the spin rate sufficiently for approach shots, the cover composition preferably has a slab hardness of 20 or more, more preferably 25 or more, even more preferably 30 or more in Shore D hardness.

Manufacturing Method for Golf Ball

The core of the golf ball of the present invention can be obtained by mixing, kneading the above mentioned core rubber composition and molding the core rubber composition in a mold. The conditions for molding the core rubber composition are not particularly limited, but molding is generally carried out for 10 to 60 minutes at a temperature of 130° C. to 200° C. under a pressure from 2.9 MPa to 11.8 MPa. Particularly, molding the core rubber composition is preferably carried out for 10 to 60 minutes at a temperature of 130° C. to 200° C., or alternatively in a two-step heating for 20 to 40 minutes at a temperature of 130° C. to 150° C. and continuously for 5 to 15 minutes at a temperature of 160° C. to 180° C.

The intermediate layer is formed, for example, by covering the core with the golf ball resin composition. The method to form the intermediate layer is not particularly limited, and includes, for example, an embodiment which comprises molding the golf ball resin composition into a semi-spherical half shell, covering the core with the two half shells, and subjecting the core with the two half shells to compression molding at a temperature of 130° C. to 170° C. for 1 to 5 minutes; and an embodiment which comprises injection molding the golf ball resin composition directly onto the core to cover the core. The intermediate layer of the golf ball of the present invention is preferably formed by injection molding. The intermediate layer can be produced more easily by injection molding.

In the case of injection molding the golf ball resin composition onto the core to form the intermediate layer, the golf ball resin composition extruded in a pellet form may be used for injection molding, or various materials such as the resin components and the pigment may be dry blended, followed by directly injection molding the blended material. In the present invention, the golf ball resin composition extruded in a pellet form is preferably used for injection molding. It is preferred to use upper and lower molds having a semi-spherical cavity and pimples for forming the intermediate layer, wherein a part of the pimple also serves as a retractable hold pin. When forming the intermediate layer by injection molding, the hold pin is protruded to hold the core, the golf ball resin composition which has been heated and melted is charged and then cooled to obtain the intermediate layer.

When molding the intermediate layer in a compression molding method, molding of the half shell can be performed by either the compression molding method or the injection molding method, and the compression molding method is preferred. Compression molding the golf ball resin composition into the half shell can be carried out, for example, under a pressure of 1 MPa or more and 20 MPa or less at a temperature of −20° C. or more and +70° C. or less relative to the flow beginning temperature of the golf ball resin composition. By performing the molding under the above conditions, the half shell having a uniform thickness can be formed. Examples of the method for molding the intermediate layer by using the half shell include, for example, a method which comprises covering the core with two half shells and then performing compression molding. Compression molding half shells into the intermediate layer can be carried out, for example, under a pressure of 0.5 MPa or more and 25 MPa or less at a temperature of −20° C. or more and +70° C. or less relative to the flow beginning temperature of the golf ball resin composition. By performing the molding under the above conditions, the intermediate layer having a uniform thickness can be formed.

The molding temperature means the highest temperature where a temperature at the surface of the concave portion of the lower mold reaches from closing through opening the molds. Further, the flow beginning temperature of the golf ball resin composition can be measured in a pellet form under the following conditions by using "Flow Tester CFT-500" manufactured by Shimadzu Corporation. Measuring conditions: Area size of a plunger 1 $cm^2$, Die length: 1 mm, Die diameter. 1 mm, Load: 588.399 N, Start temperature: 30° C., and Temperature increase rate: 3° C./min.

The method for molding the cover of the golf ball of the present invention includes, for example, an embodiment which comprises molding the cover composition into a hollow shell, covering the spherical body consisting of the core and the intermediate layer with a plurality of hollow shells and subjecting to compression molding (preferably an embodiment which comprises molding the cover composition into a hollow half shell, covering the spherical body consisting of the core and the intermediate layer with two half shells and subjecting to compression molding); or an embodiment which comprises injection molding the cover composition directly onto the spherical body consisting of the core and the intermediate layer.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the spherical body consisting of the core and the intermediate layer with two half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended material. It is preferred to use upper and lower molds having a semi-spherical cavity and pimples for forming the cover, wherein a part of the pimples also serves as a retractable hold pin. When molding the cover by injection molding, the hold pin is protruded to hold the spherical body consisting of the core and the intermediate layer, the cover composition is charged and then cooled to obtain the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to obtain the cover.

The concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples formed on the cover includes, for example, without limitation, a circle; a polygonal shape such as roughly triangular shape, roughly quadrangular shape, roughly pentagonal shape or roughly hexagonal shape; or another irregular shape. The shape of dimples is employed solely or at least two of them may be used in combination.

After the cover is molded, the golf ball body is ejected from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or more, more preferably 7 μm or more, and preferably has a thickness of 50 μm or less, more preferably 25 μm or less, even more preferably 18 μm or less. If the thickness is less than 5 μm, the paint film is easy to wear off due to continued use of the golf ball, and if the thickness is more than 50 μm, the dimple effect is reduced, resulting in lowering flight performance of the golf ball.

Structure of Golf Ball

The core of the golf ball of the present invention preferably has a diameter of 34.8 mm or more, more preferably 35.0 mm or more, even more preferably 35.2 mm or more, and preferably has a diameter of 41.2 mm or less, more preferably 41.0 mm or less, even more preferably 40.8 mm or less. If the core has a diameter of 34.8 mm or more, the thickness of the intermediate layer or the cover does not become too thick and thus the resilience becomes better. On the other hand, if the core has a diameter of 41.2 mm or less, the thickness of the intermediate layer or the cover does not become too thin, and thus the intermediate layer or the cover functions better.

When the core has a diameter from 34.8 mm to 41.2 mm, the compression deformation amount (shrinking amount of the core along the compression direction) of the core when applying a load from 98 N as an initial load to 1275 N as a final load on the core is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling of the golf ball becomes better. If the compression deformation amount is 4.00 mm or less, the resilience of the golf ball becomes better.

The core preferably has a surface hardness of 45 or more, more preferably 50 or more, even more preferably 55 or more, and preferably has a surface hardness of 65 or less, more preferably 62 or less, even more preferably 60 or less in Shore D hardness. If the surface hardness of the core is 45 or more in Shore D hardness, the core does not become excessively soft, and thus the better resilience is obtained. Further, if the surface hardness of the core is 65 or less in Shore D hardness, the core does not become excessively hard, and thus the better shot feeling is obtained.

The core preferably has a center hardness of 30 or more, more preferably 32 or more, even more preferably 35 or more in Shore D hardness. If the center hardness of the core is less than 30 in Shore D hardness, the core becomes so soft that the resilience may be lowered. Further, the core preferably has a center hardness of 50 or less, more preferably 48 or less, even more preferably 46 or less in Shore D hardness. If the center hardness exceeds 50 in Shore D hardness, the core becomes so hard that the shot feeling tends to be lowered. In the present invention, the center hardness is a hardness measured with a Shore D type spring hardness tester at the central point of the cut plane which is obtained by cutting the core into two hemispheres.

Further, the surface hardness of the core is preferably larger than the center hardness of the core. If the surface hardness of the core is larger than the center hardness of the core, the golf ball showing high launch angle and low spin rate on driver shots can be obtained. The golf ball showing high launch angle and low spin rate travels a great flight distance. The core preferably has a hardness difference (surface hardness–center hardness) between the surface hardness and the center hardness thereof of 4 or more, more preferably 7 or more in Shore D hardness. The hardness difference (surface hardness–center hardness) is preferably 40 or less, more preferably 35 or less in Shore D hardness. If the hardness difference is excessively large, the durability of the golf ball may be lowered.

The intermediate layer of the golf ball of the present invention preferably has a thickness of 1.5 mm or less, more preferably 1.4 mm or less, even more preferably 1.2 mm or less. If the thickness of the intermediate layer is 1.5 mm or less, the resilience and shot feeling of the obtained golf ball become better. The thickness of the intermediate layer is preferably 0.5 mm or more, more preferably 0.6 mm or more, even more preferably 0.7 mm or more. If the thickness of the intermediate layer is 0.5 mm or more, it becomes easy to mold the intermediate layer, and the durability of the obtained golf ball improves.

In the case that the golf ball of the present invention comprises at least two intermediate layers, at least one intermediate layer may be formed from the above mentioned golf ball resin composition. In this case, the outermost intermediate layer is preferably formed from the above mentioned golf ball resin composition. In addition, in one preferable embodiment, all the intermediate layers are formed from the above mentioned golf ball resin composition.

The thickness of the cover is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, even more preferably 0.3 mm or more. If the thickness of the cover is less than 0.1 mm, it may become difficult to mold the cover. In addition, the durability and the wear resistance of the cover may deteriorate.

When the golf ball of the present invention has a diameter from 40 mm to 45 mm, the compression deformation amount (shrinking amount of the golf ball along the compression direction) of the golf ball when applying a load from 98 N as an initial load to 1275 N as a final load on the golf ball is preferably 2.0 mm or more, more preferably 2.2 mm or more, and is preferably 4.0 mm or less, more preferably 3.5 mm or less. The 15 golf ball having a compression deformation amount of 2.0 mm or more is not excessively hard and thus has good shot feeling. If the compression deformation amount is 4.0 mm or less, the resilience of the golf ball becomes better.

EXAMPLES

Hereinafter, the present invention will be described in detail by way of examples. The present invention is not limited to the examples described below. Various changes and modifications can be made without departing from the spirit and scope of the present invention.

(1) Melt Flow Rate (MFR) (g/10 min)

MFR was measured according to JIS K7210 by using a flow tester (SHIMADZU Flow Tester CFT-100C, manufactured by SHIMADZU CORPORATION). Measurement was carried out at the conditions of: 190° C.×2.16 kgf; 210° C.×2.16 kgf; 230° C.×2.16 kgf; 240° C.×2.16 kgf; or 260° C.×load 325 gf.

(2) Flexural Modulus (Three-Point Bending, MPa)

A test piece with a length of 80.0±2 mm, a width of 10.0±0.2 mm and a thickness of 4.0±0.2 mm was produced by injection molding the golf ball resin composition. The obtained test piece was stored at 23° C.±2° C. for 24 hours or more in a moisture-proof container immediately. After the test piece was taken out of the moisture-proof container, the flexural modulus thereof was measured rapidly (within fifteen minutes) according to ISO 178. The measurement was carried out at the temperature of 23° C., the humidity of 50 RH %.

(3) Slab Hardness (Shore D Hardness)

Sheets with a thickness of about 2 mm were produced by injection molding the cover composition or the golf ball resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester.

(4) Core Hardness (Shore D Hardness)

The Shore D hardness measured at the surface of the core by using a type P1 auto loading durometer manufactured by Kobunshi Keiki Co., Ltd., provided with a Shore D type spring hardness tester prescribed in ASTM-D2240 was adopted as the surface hardness Hs of the core. The Shore D hardness measured at the central point of the cut plane which is obtained by cutting the core into two hemispheres was adopted as the center hardness Ho of the core.

(5) Compression Deformation Amount (mm)

The compression deformation amount of the golf ball or core (shrinking amount of the golf ball or core along the compression direction), when applying a load from 98 N as an initial load to 1275 N as a final load to the golf ball or core, was measured.

(6) Rebound Resilience (%)

A sheet with a thickness of about 2 mm was produced by heat press-molding the golf ball resin composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(7) Coefficient of Restitution

A 198.4 g of metal cylindrical object was forced to collide with each golf ball at a speed of 45 m/sec. and the speeds of the cylindrical object and the golf ball before and after the collision were measured. Based on these speeds and the mass of each object, the coefficient of restitution for each golf ball was calculated. The measurement was conducted by using twelve samples for each golf ball, and the average value was regarded as the coefficient of restitution for the golf ball.

(8) Flight Distance (m), Ball Initial Speed (m/s) and Spin Rate (rpm) on Driver Shots A metal-headed W#1 driver (XXIO, Shaft: S, loft: 10.5°, manufactured by Dunlop Sports Limited) was installed on a swing robot M/C manufactured by Golf Laboratories, Inc. A golf ball was hit at a head speed of 50 m/sec, and the ball initial speed, spin rate and flight distance (the distance from the launch point to the stop point) right after hitting the golf ball were measured. This measurement was conducted twelve times for each golf ball, and the average value thereof was adopted as the measurement value for the golf ball. A sequence of photographs of the hit golf ball were taken for measuring the spin rate right after hitting the golf ball.

[Preparation of Organically Modified Layered Silicate]

100 g of Na-type montmorillonite (Kunimine Industries Co., Ltd., Kunipia F, cation exchange capacity: 120 meq/100 g) was stirred and dispersed in 10 L of warm water, and 2 L of warm water, in which 51 g (equivalent to cation exchange capacity) of benzyl dimethyl octadecyl ammonium chloride was dissolved, was added therein, the resultant mixture was stirred for 1 hour. The generated precipitate was filtered for separation, and rinsed with warm water. This operation of rinsing and filtering for separation was performed for three times. The obtained solid was vacuum-dried at 80° C. to obtain a dried organically modified layered silicate. Soxhlet extraction was performed for 5 hours with methanol. When the amount of benzyl dimethyl octadecyl ammonium chloride contained in the organically modified layered silicate was quantified, it was revealed that the amount was 0.1 mass % or less of the amount of the organically modified layered silicate.

[Production of Golf Ball]

(1) Production of Core

The rubber compositions having formulations shown in Table 1 were kneaded, and heat-pressed in upper and lower molds, each having a hemispherical cavity, at 170° C. for 30 minutes to prepare the core.

TABLE 1

| Core composition | Formulation (Parts by mass) |
| --- | --- |
| Polybutadiene rubber | 100 |
| Zinc acrylate | 39 |
| Zinc oxide | 5 |
| Barium sulfate | Appropriate amount* |
| Diphenyl disulfide | 0.5 |
| Dicumyl peroxide | 0.8 |
| Diameter (mm) | 39.7 |
| Surface hardness (Shore D) | 58 |
| Center hardness (Shore D) | 41 |
| Compression deformation amount (mm) | 2.7 |

*Depending on the core composition, adjustment was made such that the golf ball had a mass of 45.3 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation.
Diphenyl disulfide: manufactured by Sumitomo Seika Chemicals Co., Ltd.

(2) Production of Intermediate Layer

Next, the blending materials shown in Tables 2-4 were extruded with a twin-screw kneading extruder to prepare the golf ball resin compositions in a pellet form. The extruding conditions were a screw diameter of 45 mm, a screw rotational speed of 200 rpm, and screw L/D=35. The mixtures were heated to 150 to 230° C. at the die position of the extruder. The obtained golf ball resin composition was injection molded onto the core obtained above to mold the intermediate layer (thickness: 1.0 mm).

TABLE 2

| | | | | | | Golf ball No. | | | | |
|---|---|---|---|---|---|---|---|---|---|---|
| | | | | | | 1 | 2 | 3 | 4 | 5 |
| Intermediate layer | Golf ball resin composition | Formulation (Parts by mass) | Resin component | (A) | Polyamide resin 1 | 15 | 20 | 40 | 40 | 40 |
| | | | | (B) | Himilan AM7327 | — | — | — | — | — |
| | | | | | Himilan AM7329 | — | — | — | — | — |
| | | | | | Himilan AM7337 | — | — | — | — | — |
| | | | | | Surlyn 9150 | 42.5 | 40 | 30 | 30 | 30 |
| | | | | | Surlyn 8150 | 42.5 | 40 | 30 | 30 | 30 |
| | | | (C) | | Organically modified layered silicate | 0.5 | 0.5 | 0.5 | 1 | 3 |
| | | | Additive | | LOTADER AX8840 | — | — | — | — | — |
| | | | | | Mg stearate | — | — | — | — | — |
| | | | | | Stearic acid | — | — | — | — | — |
| | | Properties | | | Slab hardness (Shore D) | 71 | 71 | 75 | 75 | 76 |
| | | | | | Flexural modulus (MPa) | 455 | 500 | 690 | 730 | 770 |
| | | | | | Rebound resilience (%) | 54 | 54 | 53 | 53 | 53 |
| | | | | | MFR (240° C., 2.16 kgf) (g/10 min) | 16 | 14 | 11 | 11 | 11 |
| | | | | | Flexural modulus × (MPa)/(A) content | 30.3 | 25.0 | 17.3 | 18.3 | 19.3 |
| Golf ball | | | | | Compression deformation amount (mm) | 2.30 | 2.28 | 2.23 | 2.22 | 2.21 |
| | | | | | Coefficient of restitution | 0.771 | 0.772 | 0.774 | 0.774 | 0.774 |
| | | | | | Driver spin rate (rpm) | 2460 | 2455 | 2440 | 2430 | 2420 |
| | | | | | Ball initial speed (m/s) | 73.66 | 73.66 | 73.72 | 73.73 | 73.74 |
| | | | | | Driver spin rate difference (rpm) | 40 | 45 | 60 | 70 | 80 |
| | | | | | Ball initial speed difference (m/s) | 0.070 | 0.070 | 0.130 | 0.140 | 0.150 |
| | | | | | Flight distance (m) | 266.8 | 266.8 | 267.3 | 267.5 | 267.7 |

| | | | | | | Golf ball No. | | | | |
|---|---|---|---|---|---|---|---|---|---|---|
| | | | | | | 6 | 7 | 8 | 9 | 10 |
| Intermediate layer | Golf ball resin composition | Formulation (Parts by mass) | Resin component | (A) | Polyamide resin 1 | 40 | 40 | 40 | 40 | 40 |
| | | | | (B) | Himilan AM7327 | — | — | — | — | 10 |
| | | | | | Himilan AM7329 | — | — | — | 30 | — |
| | | | | | Himilan AM7337 | — | — | — | 30 | — |
| | | | | | Surlyn 9150 | 30 | 30 | 30 | — | 20 |
| | | | | | Surlyn 8150 | 30 | 30 | 30 | — | 30 |
| | | | (C) | | Organically modified layered silicate | 5 | 10 | 15 | 0.5 | 0.5 |
| | | | Additive | | LOTADER AX8840 | — | — | — | — | — |
| | | | | | Mg stearate | — | — | — | — | — |
| | | | | | Stearic acid | — | — | — | — | — |
| | | Properties | | | Slab hardness (Shore D) | 76 | 77 | 77 | 74 | 74 |
| | | | | | Flexural modulus (MPa) | 790 | 870 | 940 | 620 | 640 |
| | | | | | Rebound resilience (%) | 53 | 53 | 54 | 51 | 52 |
| | | | | | MFR (240° C., 2.16 kgf) (g/10 min) | 11 | 11 | 10 | 12 | 11 |
| | | | | | Flexural modulus × (MPa)/(A) content | 19.8 | 21.8 | 23.5 | 15.5 | 16.0 |
| Golf ball | | | | | Compression deformation amount (mm) | 2.2 | 2.18 | 2.17 | 2.25 | 2.25 |
| | | | | | Coefficient of restitution | 0.774 | 0.775 | 0.775 | 0.771 | 0.773 |
| | | | | | Driver spin rate (rpm) | 2410 | 2395 | 2380 | 2435 | 2430 |
| | | | | | Ball initial speed (m/s) | 73.75 | 73.77 | 73.78 | 73.64 | 73.69 |
| | | | | | Driver spin rate difference (rpm) | 90 | 105 | 120 | 65 | 70 |
| | | | | | Ball initial speed difference (m/s) | 0.160 | 0.180 | 0.190 | 0.050 | 0.100 |
| | | | | | Flight distance (m) | 267.8 | 268.0 | 268.1 | 266.9 | 267.2 |

| | | | | | | Golf ball No. | | | |
|---|---|---|---|---|---|---|---|---|---|
| | | | | | | 11 | 12 | 13 | 14 |
| Intermediate layer | Golf ball resin composition | Formulation (Parts by mass) | Resin component | (A) | Polyamide resin 1 | 40 | 60 | 60 | 80 |
| | | | | (B) | Himilan AM7327 | 10 | — | — | — |
| | | | | | Himilan AM7329 | 20 | — | 20 | — |
| | | | | | Himilan AM7337 | 30 | — | 20 | — |
| | | | | | Surlyn 9150 | — | 20 | — | 10 |
| | | | | | Surlyn 8150 | — | 20 | — | 10 |
| | | | (C) | | Organically modified layered silicate | 0.5 | 0.5 | 0.5 | 0.5 |
| | | | Additive | | LOTADER AX8840 | — | — | — | — |
| | | | | | Mg stearate | — | — | — | — |
| | | | | | Stearic acid | — | — | — | — |

TABLE 2-continued

| | | | | | |
|---|---|---|---|---|---|
| Golf ball | Properties | Slab hardness (Shore D) | 73 | 76 | 75 | 78 |
| | | Flexural modulus (MPa) | 570 | 830 | 780 | 1020 |
| | | Rebound resilience (%) | 51 | 51 | 50 | 50 |
| | | MFR (240° C., 2.16 kgf) (g/10 min) | 12 | 9.6 | 11 | 5.2 |
| | | Flexural modulus × (MPa)/(A) content | 14.3 | 13.8 | 13.0 | 12.8 |
| | | Compression deformation amount (mm) | 2.28 | 2.19 | 2.21 | 2.16 |
| | | Coefficient of restitution | 0.771 | 0.773 | 0.769 | 0.770 |
| | | Driver spin rate (rpm) | 2445 | 2415 | 2450 | 2400 |
| | | Ball initial speed (m/s) | 73.63 | 73.69 | 73.64 | 73.61 |
| | | Driver spin rate difference (rpm) | 55 | 85 | 50 | 100 |
| | | Ball initial speed difference (m/s) | 0.040 | 0.100 | 0.050 | 0.020 |
| | | Flight distance (m) | 266.8 | 267.4 | 266.8 | 267.0 |

TABLE 3

| | | | | | | Golf ball No. | | | | | |
|---|---|---|---|---|---|---|---|---|---|---|---|
| | | | | | | 15 | 16 | 17 | 18 | 19 | 20 |
| Intermediate layer | Golf ball resin composition | Formulation (Parts by mass) | Resin component | (A) | Polyamide resin 1 | 40 | 40 | 20 | 60 | 40 | 60 |
| | | | | (B) | Himilan AM7327 | — | — | — | — | 10 | — |
| | | | | | Himilan AM7329 | — | — | — | — | 20 | — |
| | | | | | Himilan AM7337 | — | — | — | — | 30 | — |
| | | | | | Surlyn 9150 | 30 | 30 | 40 | 20 | — | 20 |
| | | | | | Surlyn 8150 | 30 | 30 | 40 | 20 | — | 20 |
| | | | (C) | | Organically modified layered silicate | 0.5 | 0.5 | 0.5 | 0.5 | — | — |
| | | | Additive | | LOTADER AX8840 | — | — | — | — | — | — |
| | | | | | Mg stearate | — | — | — | — | — | — |
| | | | | | Stearic acid | 1 | 5 | 1 | 1 | — | — |
| Golf ball | Properties | Slab hardness (Shore D) | | | | 75 | 76 | 71 | 76 | 70 | 75 |
| | | Flexural modulus (MPa) | | | | 700 | 720 | 510 | 840 | 480 | 710 |
| | | Rebound resilience (%) | | | | 53 | 53 | 54 | 51 | 49 | 51 |
| | | MFR (240° C., 2.16 kgf) (g/10 min) | | | | 15 | 18 | 18 | 13 | 12 | 10 |
| | | Flexural modulus × (MPa)/(A) content | | | | 17.5 | 18.0 | 25.5 | 14.0 | 12.0 | 11.8 |
| | | Compression deformation amount (mm) | | | | 2.23 | 2.22 | 2.28 | 2.19 | 2.29 | 2.21 |
| | | Coefficient of restitution | | | | 0.774 | 0.774 | 0.772 | 0.773 | 0.766 | 0.770 |
| | | Driver spin rate (rpm) | | | | 2435 | 2430 | 2450 | 2410 | 2480 | 2450 |
| | | Ball initial speed (m/s) | | | | 73.72 | 73.73 | 73.66 | 73.69 | 73.52 | 73.61 |
| | | Driver spin rate difference (rpm) | | | | 65 | 70 | 50 | 90 | 20 | 50 |
| | | Ball initial speed difference (m/s) | | | | 0.130 | 0.140 | 0.070 | 0.100 | −0.070 | 0.020 |
| | | Flight distance (m) | | | | 267.4 | 267.5 | 266.9 | 267.4 | 265.7 | 266.5 |

| | | | | | | Golf ball No. | | | | |
|---|---|---|---|---|---|---|---|---|---|---|
| | | | | | | 21 | 22 | 23 | 24 | 25 |
| Intermediate layer | Golf ball resin composition | Formulation (Parts by mass) | Resin component | (A) | Polyamide resin 1 | 60 | 80 | 90 | 10 | 90 |
| | | | | (B) | Himilan AM7327 | — | — | — | — | — |
| | | | | | Himilan AM7329 | 20 | — | — | — | — |
| | | | | | Himilan AM7337 | 20 | — | — | — | — |
| | | | | | Surlyn 9150 | — | 10 | 5 | 45 | 5 |
| | | | | | Surlyn 8150 | — | 10 | 5 | 45 | 5 |
| | | | (C) | | Organically modified layered silicate | — | — | — | 0.5 | 0.5 |
| | | | Additive | | LOTADER AX8840 | — | — | — | — | — |
| | | | | | Mg stearate | — | — | — | — | — |
| | | | | | Stearic acid | — | — | — | — | — |
| Golf ball | Properties | Slab hardness (Shore D) | | | | 74 | 76 | 77 | 70 | 79 |
| | | Flexural modulus (MPa) | | | | 680 | 880 | 1020 | 420 | 1120 |
| | | Rebound resilience (%) | | | | 49 | 49 | 47 | 55 | 48 |
| | | MFR (240° C., 2.16 kgf) (g/10 min) | | | | 11 | 6.3 | 3.8 | 17 | 2.8 |
| | | Flexural modulus × (MPa)/(A) content | | | | 11.3 | 11.0 | 11.3 | 42.0 | 12.4 |
| | | Compression deformation amount (mm) | | | | 2.23 | 2.19 | 2.16 | 2.31 | 2.13 |
| | | Coefficient of restitution | | | | 0.766 | 0.766 | 0.763 | 0.771 | 0.767 |
| | | Driver spin rate (rpm) | | | | 2430 | 2420 | 2400 | 2465 | 2385 |
| | | Ball initial speed (m/s) | | | | 73.49 | 73.50 | 73.44 | 73.65 | 73.55 |
| | | Driver spin rate difference (rpm) | | | | 70 | 80 | 100 | 35 | 115 |
| | | Ball initial speed difference (m/s) | | | | −0.100 | −0.090 | −0.150 | 0.060 | −0.040 |
| | | Flight distance (m) | | | | 265.9 | 266.1 | 265.9 | 266.7 | 266.7 |

TABLE 4

| | | | | | | Golf ball No. | | |
|---|---|---|---|---|---|---|---|---|
| | | | | | | 26 | 27 | 28 |
| Intermediate layer | Golf ball resin composition | Formulation (Parts by mass) | Resin component | (A) | Polyamide resin 2 | 40 | 60 | 60 |
| | | | | | Polyamide resin 3 | — | — | — |
| | | | | (B) | Himilan AM7327 | — | — | — |
| | | | | | Himilan AM7329 | 30 | 20 | 20 |
| | | | | | Himilan AM7337 | 30 | 20 | 20 |
| | | | | | Surlyn 9150 | — | — | — |
| | | | | | Surlyn 8150 | — | — | — |
| | | | | (C) | Organically modified layered silicate | — | — | — |
| | | | Additive | | LOTADER AX8840 | — | — | — |
| | | | | | Mg stearate | — | — | 5 |
| | | | | | Stearic acid | — | — | — |
| | | Properties | | | Slab hardness (Shore D) | 68 | 69 | 70 |
| | | | | | Flexural modulus (MPa) | 495 | 639 | 653 |
| | | | | | Rebound resilience (%) | 49 | 49 | 49 |
| | | | | | MFR (240° C., 2.16 kgf) (g/10 min) | 11 | 3.2 | 18 |
| Golf ball | | | | | Flexural modulus × (MPa)/(A) content | 12.4 | 10.7 | 10.9 |
| | | | | | Compression deformation amount (mm) | 2.30 | 2.25 | 2.28 |
| | | | | | Coefficient of restitution | 0.765 | 0.766 | 0.766 |
| | | | | | Driver spin rate (rpm) | 2500 | 2480 | 2475 |
| | | | | | Ball initial speed (m/s) | 73.48 | 73.51 | 73.51 |
| | | | | | Driver spin rate difference (rpm) | 0 | 20 | 25 |
| | | | | | Ball initial speed difference (m/s) | −0.110 | −0.080 | −0.080 |
| | | | | | Flight distance (m) | 265.3 | 265.6 | 265.7 |

| | | | | | | Golf ball No. | | |
|---|---|---|---|---|---|---|---|---|
| | | | | | | 29 | 30 | 31 |
| Intermediate layer | Golf ball resin composition | Formulation (Parts by mass) | Resin component | (A) | Polyamide resin 2 | — | — | — |
| | | | | | Polyamide resin 3 | 60 | — | — |
| | | | | (B) | Himilan AM7327 | — | — | — |
| | | | | | Himilan AM7329 | 20 | — | 50 |
| | | | | | Himilan AM7337 | 20 | — | 50 |
| | | | | | Surlyn 9150 | — | 50 | — |
| | | | | | Surlyn 8150 | — | 50 | — |
| | | | | (C) | Organically modified layered silicate | — | — | — |
| | | | Additive | | LOTADER AX8840 | 5 | — | — |
| | | | | | Mg stearate | — | — | — |
| | | | | | Stearic acid | — | — | — |
| | | Properties | | | Slab hardness (Shore D) | 68 | 69 | 65 |
| | | | | | Flexural modulus (MPa) | 500 | 350 | 290 |
| | | | | | Rebound resilience (%) | 49 | 55 | 53 |
| | | | | | MFR (240° C., 2.16 kgf) (g/10 min) | 1.2 | — | — |
| Golf ball | | | | | Flexural modulus × (MPa)/(A) content | 8.3 | — | — |
| | | | | | Compression deformation amount (mm) | 2.29 | 2.35 | 2.41 |
| | | | | | Coefficient of restitution | 0.766 | 0.770 | 0.763 |
| | | | | | Driver spin rate (rpm) | 2500 | 2500 | 2560 |
| | | | | | Ball initial speed (m/s) | 73.49 | 73.59 | 73.50 |
| | | | | | Driver spin rate difference (rpm) | 0 | 0 | −60 |
| | | | | | Ball initial speed difference (m/s) | −0.100 | 0.000 | −0.09 |
| | | | | | Flight distance (m) | 265.4 | 266.0 | 264.9 |

Materials used in Tables 2-4 are shown below.
Polyamide resin 1: AMILAN CM1017K (Polyamide 6, degree of crystallinity: 7%, flexural modulus: 3.1 GPa (23° C. absolute dry), relative viscosity: 2.65, melt flow rate (260° C., 325 gf): 8.27 g/min) manufactured by Toray Industries, Inc.
Polyamide resin 2: NOVAMID ST120 which is a mixed resin of polyamide 6 and a resin having at least one functional group selected from the group consisting of a hydroxyl group, a carboxyl group, an anhydride group, a sulfonic acid group, and an epoxy group (including a glycidyl group) (flexural modulus: 2,000 MPa, melt flow rate (240° C., 2.16 kgf): 30 g/10 min) manufactured by Mitsubishi-Engineering Plastics Company.
Polyamide resin 3: NOVAMID ST220 which is a polyamide resin (Polyamide 6, high impact-grade, flexural modulus: 2,000 MPa) manufactured by Mitsubishi Engineering-Plastics Company.
Himilan AM7327: Zinc ion neutralized ethylene-methacrylic acid-butyl acrylate ternary copolymer ionomer resin (melt flow rate (190° C., 2.16 kgf): 0.7 g/10 min, flexural modulus: 35 MPa, Shore D hardness: 42) manufactured by Du Pont-Mitsui Polychemicals Co., Ltd.
Himilan AM7329: Zinc ion neutralized ethylene-methacrylic acid copolymer ionomer resin (melt flow rate (190° C., 2.16 kgf): 5 g/10 min, flexural modulus: 240 MPa, Shore D hardness: 62) manufactured by Du Pont-Mitsui Polychemicals Co., Ltd.
Himilan AM7337: Sodium ion neutralized ethylene-methacrylic acid copolymer ionomer resin (melt flow rate (190° C., 2.16 kgf): 5 g/10 min, flexural modulus: 254 MPa, Shore D hardness: 64) manufactured by Du Pont-Mitsui Polychemicals Co., Ltd.
Surlyn 9150: Zinc ion neutralized ethylene-methacrylic acid copolymer ionomer resin (content of acid component: 17 mass % or more, flexural modulus: 270 MPa, melt flow rate (190° C., 2.16 kgf): 4.5 g/10 min, Shore D hardness: 64) manufactured by E.I. du Pont de Nemours and Company. Surlyn 8150: Sodium ion neutralized ethylene-methacrylic acid copolymer ionomer resin (content of acid component: 17 mass % or more, flexural modulus: 390 MPa, melt flow rate (190° C., 2.16 kgf): 4.5 g/10 min. Shore D hardness: 68) manufactured by E.I. du Pont de Nemours and Company.

(3) Molding of Half Shell 100 parts by mass of the polyurethane elastomer and 4 parts by mass of titanium oxide shown in Table 5 were dry blended, and mixed with a twin-screw kneading extruder to obtain the cover compositions in a pellet form. The extruding conditions were a screw diameter of 45 mm, a screw rotational speed of 200 rpm, and screw L/D=35. The mixtures were heated to 150 to 230° C. at the die position of the extruder. The compression molding of half shells was carried out by charging the obtained cover composition in the pellet form into each concave portion of the lower mold for molding the half shells, and performing compression to form the half shells. The compression molding was performed at the temperature of 170° C. for five minutes under the pressure of 2.94 MPa.

TABLE 5

| Cover composition | Formulation (Parts by mass) |
| --- | --- |
| Elastollan XNY85A | 100 |
| Titanium oxide | 4 |
| Slab hardness (Shore D) | 32 |

Elastollan XNY85A: Thermoplastic polyurethane elastomer manufactured by BASF Ltd.

(4) Molding of Cover

The intermediate layer obtained in (2) was covered concentrically with two half shells obtained in (3) and compression molded to form the cover (thickness: 0.5 mm). The compression molding was performed at the temperature of 145° C. for two minutes under the pressure of 9.8 MPa.

Figure 2:
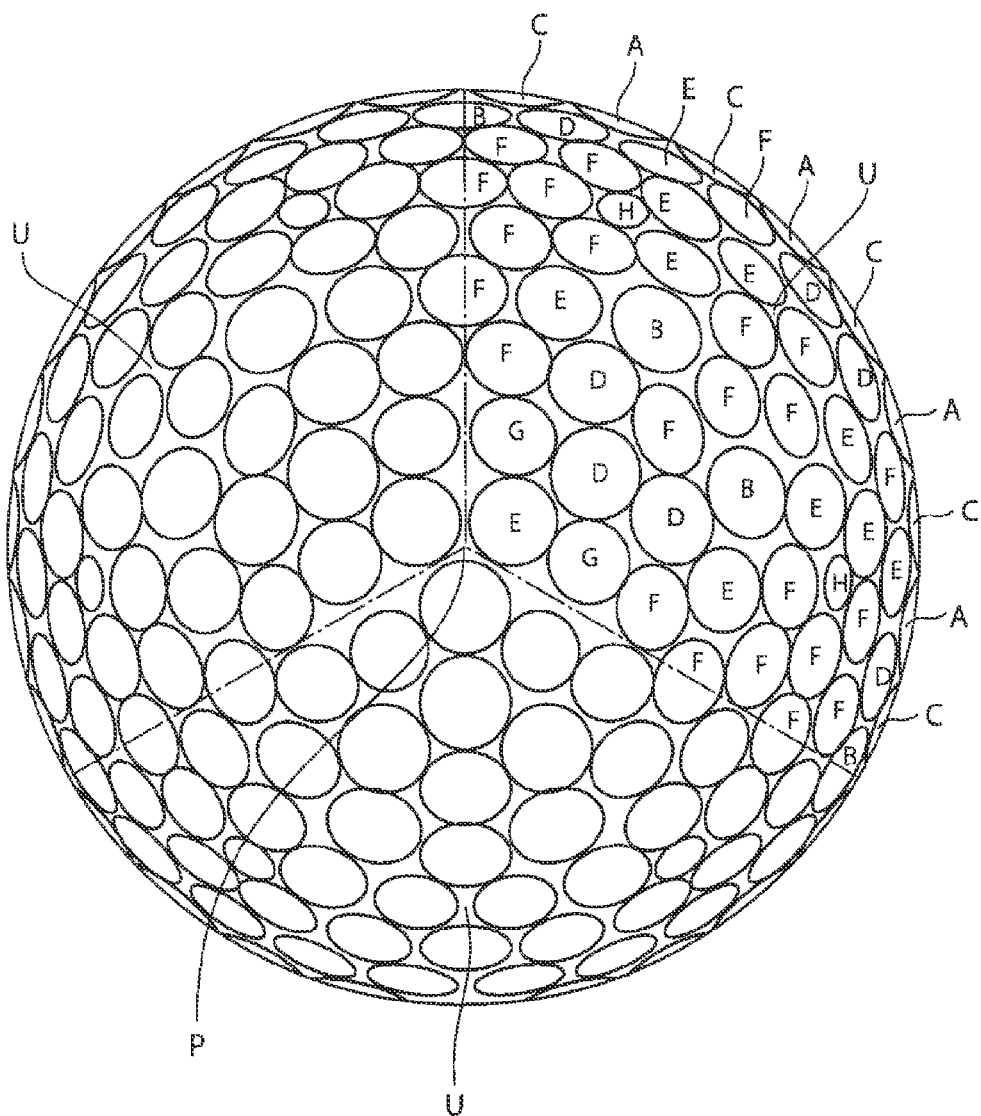
FIG. 2 is a plan view of dimple patterns formed on the surface of the golf ball.

On the surface of the golf balls, dimple patterns shown in Table 6, FIG. 1 and FIG. 2 were formed. The northern hemisphere N and the southern hemisphere S of the golf balls have U units that are 120 degree rotational symmetrical to one another. The number of U units on each of the northern hemisphere N and the southern hemisphere S is 3. In FIG. 2, the dimple types of only one U unit are shown with symbols A to H.

TABLE 6

| Type | Number | Diameter (mm) | Depth (mm) | Curvature radius (mm) | Volume (mm³) | Front view | Plan view |
| --- | --- | --- | --- | --- | --- | --- | --- |
| A | 24 | 4.75 | 0.140 | 20.22 | 1.242 | FIG. 1 | FIG. 2 |
| B | 18 | 4.65 | 0.140 | 19.38 | 1.190 | | |
| C | 30 | 4.55 | 0.135 | 19.24 | 1.099 | | |
| D | 42 | 4.45 | 0.135 | 18.40 | 1.051 | | |
| E | 66 | 4.25 | 0.135 | 16.79 | 0.959 | | |
| F | 126 | 4.05 | 0.130 | 15.84 | 0.839 | | |
| G | 12 | 3.95 | 0.130 | 15.07 | 0.798 | | |
| H | 12 | 2.80 | 0.120 | 8.23 | 0.370 | | |

The surface of the obtained golf ball body was treated with sandblast, marked, and painted with a clear paint. The paint was dried in an oven at 40° C. and golf balls having a diameter of 42.7 mm and a mass of 45.3 g were obtained. The evaluation results with respect to the obtained golf balls were shown in Tables 2-4.

The golf balls No. 1 to No. 18 are the case that the intermediate layer thereof is formed from a golf ball resin composition containing: (A) a polyamide resin and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,βunsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, wherein a content of (A) component with respect to 100 mass % of a total of (A) component and (B) component ranges from 15 mass % to 80 mass %, a slab hardness of the golf ball resin composition is 65 or more and 80 or less in Shore D hardness, and a value (X/A) obtained by dividing a flexural modulus X (MPa) of the golf ball resin composition by the content of (A) component (A: 15 mass % to 80 mass %) is 12.5 or more. It is apparent that these golf balls travel a great flight distance on driver shots.

The resin composition of the present invention is appropriate as a resin composition for constituting a golf ball. This application is based on Japanese Patent application No. 2013-224600 filed on Oct. 29, 2013, the content of which are hereby incorporated by reference.

DESCRIPTION OF SYMBOL

A, B, C, D, E, F, G, H: dimple, N: northern hemisphere, P: pole, S: southern hemisphere, U: unit

The invention claimed is:

1. A golf ball resin composition comprising:
(A) a polyamide resin,
(B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and
(C) an organically modified layered silicate in an amount of 0.1 part by mass to 50 parts by mass with respect to 100 parts by mass of a total of (A) component and (B) component, and
a fatty acid and/or a metal salt of a fatty acid,
wherein
a content of (A) component with respect to 100 mass % of a total of (A) component and (B) component ranges from 15 mass % to 80 mass %,
a slab hardness of the golf ball resin composition is 65 or more and 80 or less in Shore D hardness,
a value (X/A) obtained by dividing a flexural modulus X (MPa) of the golf ball resin composition by the content of (A) component (A: 15 mass % to 80 mass %) is 12.5 or more, and
(C) the organically modified layered silicate includes a layered silicate treated with an organic onium ion, and the organic onium ion includes an organic ammonium ion having a total of 11 to 30 intramolecular carbon atoms.

2. The golf ball resin composition according to claim 1, wherein the golf ball resin composition has a flexural modulus ranging from 400 MPa to 4,000 MPa.

3. The golf ball resin composition according to claim 1, wherein the golf ball resin composition has a rebound resilience of 48% or more.

4. The golf ball resin composition according to claim 1, wherein a content of the α,β-unsaturated carboxylic acid having 3 to 8 carbon atoms in (B) component is 16 mass % or more.

5. A golf ball comprising a core, at least one intermediate layer covering the core, and a cover covering the intermediate layer, wherein at least one of the core, at least one intermediate layer or cover is formed from a golf ball resin composition containing:
(A) a polyamide resin,
(B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and
(C) an organically modified layered silicate in an amount of 0.1 part by mass to 50 parts by mass with respect to 100 parts by mass of a total of (A) component and (B) component, and
a fatty acid and/or a metal salt of a fatty acid,
wherein
a content of (A) component with respect to 100 mass % of a total of (A) component and (B) component ranges from 15 mass % to 80 mass %,
a slab hardness of the golf ball resin composition is 65 or more and 80 or less in Shore D hardness,
a value (X/A) obtained by dividing a flexural modulus X (MPa) of the golf ball resin composition by the content of (A) component (A: 15 mass % to 80 mass %) is 12.5 or more, and
(C) the organically modified layered silicate includes a layered silicate treated with an organic onium ion, and the organic onium ion includes an organic ammonium ion having a total of 11 to 30 intramolecular carbon atoms.

6. The golf ball according to claim 5, wherein the golf ball resin composition has a flexural modulus ranging from 400 MPa to 4,000 MPa.

7. The golf ball according to claim 5, wherein the golf ball resin composition has a rebound resilience of 48% or more.

8. The golf ball according to claim 5, wherein a content of the α,β-unsaturated carboxylic acid having 3 to 8 carbon atoms in (B) component is 16 mass % or more.

9. A golf ball resin composition containing:
(A) a polyamide resin,
(B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
(C) an organically modified layered silicate, and
a fatty acid and/or a metal salt of a fatty acid,
wherein
a content of (A) component with respect to 100 mass % of a total of (A) component and (B) component ranges from 15 mass % to 80 mass %,
a slab hardness of the golf ball resin composition is 65 or more and 80 or less in Shore D hardness, and
a value (X/A) obtained by dividing a flexural modulus X (MPa) of the golf ball resin composition by the content of (A) component (A: 15 mass % to 80 mass %) is 12.5 or more.

10. The golf ball resin composition according to claim 9, wherein (C) the organically modified layered silicate includes a layered silicate treated with an organic ammonium ion, and the organic ammonium ion includes at least one selected from the group consisting of decyl ammonium ion, dodecyl ammonium ion, oleyl ammonium ion, and benzyl ammonium ion; methyl dodecyl ammonium ion and methyl octadecyl ammonium ion; dimethyl dodecyl ammonium ion and dimethyl octadecyl ammonium ion; benzyl trimethyl ammonium ion, benzyl triethyl ammonium ion, benzyl tributyl ammonium ion, benzyl dimethyl dodecyl ammonium ion, benzyl dimethyl octadecyl ammonium ion, trioctyl methyl ammonium ion, trimethyl octyl ammonium ion, trimethyl dodecyl ammonium ion, trimethyl octadecyl ammonium ion, and dimethyl didodecyl ammonium ion; aniline ion, p-phenylene diamine ion, α-naphthylamine ion, p-aminodimethyl aniline ion, benzidine ion, pyridine ion, piperidine ion, 6-aminocaproic acid ion, 11-aminoundecanoic acid ion, and 12-aminododecanoic acid ion.

11. A golf ball comprising a core, at least one intermediate layer covering the core, and a cover covering the intermediate layer, wherein at least one of the core, at least one intermediate layer or cover is formed from a golf ball resin composition containing:
(A) a polyamide resin,
(B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester,
(C) an organically modified layered silicate, and
a fatty acid and/or a metal salt of a fatty acid,
wherein
a content of (A) component with respect to 100 mass % of a total of (A) component and (B) component ranges from 15 mass % to 80 mass %,
a slab hardness of the golf ball resin composition is 65 or more and 80 or less in Shore D hardness, and a value (X/A) obtained by dividing a flexural modulus X (MPa) of the golf ball resin composition by the content of (A) component (A: 15 mass % to 80 mass %) is 12.5 or more.

12. The golf ball according to claim 11, wherein (C) the organically modified layered silicate includes a layered silicate treated with an organic ammonium ion, and the organic ammonium ion includes at least one selected from the group consisting of decyl ammonium ion, dodecyl ammonium ion, oleyl ammonium ion, and benzyl ammonium ion; methyl dodecyl ammonium ion and methyl octadecyl ammonium ion; dimethyl dodecyl ammonium ion and dimethyl octadecyl ammonium ion; benzyl trimethyl ammonium ion, benzyl triethyl ammonium ion, benzyl tributyl ammonium ion, benzyl dimethyl dodecyl ammonium ion, benzyl dimethyl octadecyl ammonium ion, trioctyl methyl ammonium ion, trimethyl octyl ammonium ion, trimethyl dodecyl ammonium ion, trimethyl octadecyl ammonium ion, and dimethyl didodecyl ammonium ion; aniline ion, p-phenylene diamine ion, α-naphthylamine ion, p-aminodimethyl aniline ion, benzidine ion, pyridine ion, piperidine ion, 6-aminocaproic acid ion, 11-aminoundecanoic acid ion, and 12-aminododecanoic acid ion.

* * * * *